(12) United States Patent
Sand et al.

(10) Patent No.: US 12,312,811 B2
(45) Date of Patent: May 27, 2025

(54) CONSTRUCTION FOIL AND SYSTEM WITH AT LEAST ONE CONSTRUCTION FOIL

(71) Applicant: EWALD DÖRKEN AG, Herdecke (DE)

(72) Inventors: Henning Sand, Dortmund (DE); Severin Dahms, Dortmund (DE)

(73) Assignee: EWALD DÖRKEN AG, Herdecke (DE)

( * ) Notice: Subject to any disclaimer, the term of this patent is extended or adjusted under 35 U.S.C. 154(b) by 133 days.

(21) Appl. No.: 17/796,085

(22) PCT Filed: Jun. 22, 2021

(86) PCT No.: PCT/EP2021/066899
§ 371 (c)(1),
(2) Date: Jul. 28, 2022

(87) PCT Pub. No.: WO2021/259888
PCT Pub. Date: Dec. 30, 2021

(65) Prior Publication Data
US 2023/0048096 A1    Feb. 16, 2023

(30) Foreign Application Priority Data

Jun. 22, 2020   (DE) ..................... 10 2020 003 704.6

(51) Int. Cl.
*E04D 13/00*    (2006.01)
*B32B 3/08*    (2006.01)
(Continued)

(52) U.S. Cl.
CPC ............ *E04D 13/006* (2013.01); *B32B 3/085* (2013.01); *B32B 3/266* (2013.01); *B32B 5/022* (2013.01);
(Continued)

(58) Field of Classification Search
CPC ......... B32B 3/085; B32B 3/266; B32B 5/022; B32B 7/08; B32B 27/12; B32B 27/32;
(Continued)

(56) References Cited

U.S. PATENT DOCUMENTS

| | | | | |
|---|---|---|---|---|
| 2008/0287747 A1* | 11/2008 | Mestrovic | .............. | H05K 1/147 |
| | | | | 600/300 |
| 2021/0317665 A1 | 10/2021 | Hilleringmann et al. | | |
| 2023/0124964 A1* | 4/2023 | Sand | ....................... | B32B 27/32 |
| | | | | 442/395 |

FOREIGN PATENT DOCUMENTS

| | | | | |
|---|---|---|---|---|
| DE | 202014008552 U1 * | 1/2015 | ............. | A41D 31/02 |
| DE | 102019000605 B3 | 3/2020 | | |

(Continued)

OTHER PUBLICATIONS

International Search Report for International Application No. PCT/EP2021/066899, mailed Oct. 15, 2021.
(Continued)

*Primary Examiner* — Gerard Higgins
(74) *Attorney, Agent, or Firm* — Jason H. Vick; Amped IP LLC

(57) ABSTRACT

The present invention relates to construction foil (1), in particular for use in the flat roof area, with a single- or multilayer structure (3) comprising a carrier layer (2), wherein the carrier layer (2) comprises an electronic unit (4) and at least one first connecting means (7) projecting beyond the outer side (8) of the carrier layer (2) and electrically connected to the electronic unit (4), and wherein the first connecting means (7) is designed in such a way that the electronic unit (4) can be detachably connected electrically to an external connection device (9) via the first connecting means (7), preferably without tools.

12 Claims, 13 Drawing Sheets

Figure 1:
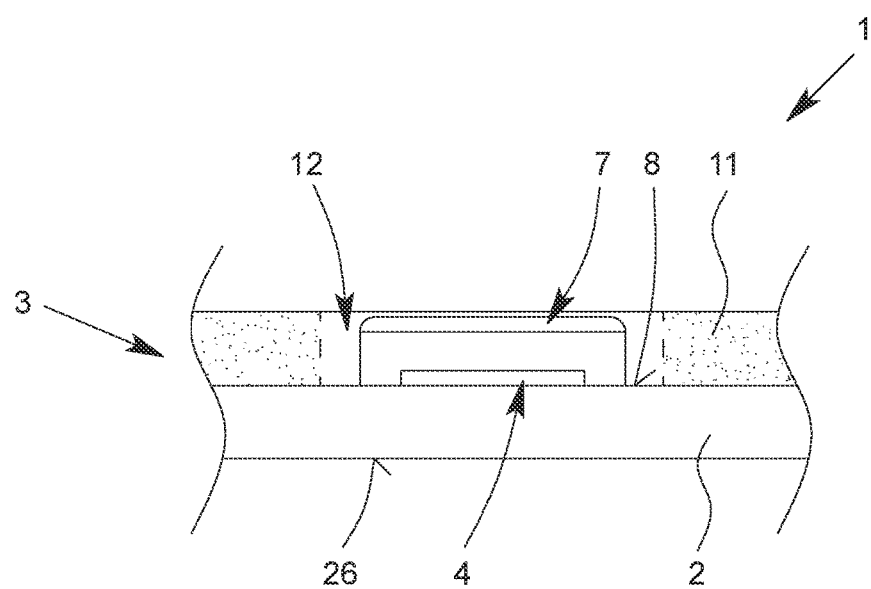

(51) Int. Cl.
*B32B 3/26* (2006.01)
*B32B 5/02* (2006.01)
*B32B 7/08* (2019.01)
*B32B 27/12* (2006.01)
*B32B 27/32* (2006.01)
*B32B 27/36* (2006.01)
*G01N 27/04* (2006.01)

(52) U.S. Cl.
CPC ............ *B32B 7/08* (2013.01); *B32B 27/12* (2013.01); *B32B 27/32* (2013.01); *B32B 27/36* (2013.01); *G01N 27/048* (2013.01); *B32B 2250/02* (2013.01); *B32B 2307/202* (2013.01); *B32B 2307/7265* (2013.01); *B32B 2419/06* (2013.01); *B32B 2457/00* (2013.01)

(58) Field of Classification Search
CPC ............ B32B 27/36; B32B 2250/02; B32B 2307/202; B32B 2307/7265; B32B 2419/06; B32B 2457/00; E04D 13/006; G01N 27/048
See application file for complete search history.

(56) References Cited

FOREIGN PATENT DOCUMENTS

| WO | WO-2007050650 A2 * | 5/2007 | ............ D02G 3/441 |
| WO | WO 2013/055065 A1 | 4/2013 | |
| WO | WO 2020/048673 A1 | 3/2020 | |

OTHER PUBLICATIONS

Written Opinion for International Application No. PCT/EP2021/066899, mailed Oct. 15, 2021.

International Preliminary Examination Report, Including Annexes for International Application No. PCT/EP2021/066899, mailed May 31, 2022.

* cited by examiner

CONSTRUCTION FOIL AND SYSTEM WITH AT LEAST ONE CONSTRUCTION FOIL

CROSS-REFERENCE TO RELATED APPLICATIONS

This application is a national stage application under 35 U.S.C. 371 of PCT Application No. PCT/EP2021/066899 having an international filing date of 22 Jun. 2021, which designated the United States, which PCT application claimed the benefit of German Application No. 10 2020 003 704.6, filed 22 Jun. 2020, each of which are incorporated herein by reference in their entirety.

The present invention relates to a construction foil, in particular for use in flat roofing, with a single-layer or multilayer structure comprising a carrier layer.

The construction foil can be used as part of a building envelope and/or a building structure when laid. In addition, the construction foil can be arranged on a building envelope and/or a building structure that has already been laid in the roof area. In particular, the construction foil is used in the construction industry and/or construction technology. Furthermore, the construction foil can be arranged underneath, facing away from the weather side, a greening and/or a plant substrate and/or a fill, in particular a gravel fill, and/or on a vapor barrier, in particular facing the interior of a building, and/or be used as a facade cladding.

Furthermore, the construction foil according to the invention can also be used in combination with a roofing membrane, roofing foil, flat roofing membrane, facade membrane, vapor barrier and/or sub-roofing membrane, in particular underlayment and/or sarking membrane. In this case, the construction foil can be arranged on the aforementioned membranes and/or firmly connected to them.

In the case of flat roofs, it is essential to ensure waterproofing and windproofing under the sealing layer and/or hard roofing and/or facade cladding and/or roof cladding. For this purpose, waterproof and windproof membranes and/or such a sealing layer, which is made of a plurality of strips of the membranes, are usually used. To produce this sealing layer, the sheets are attached as strips to the roof and/or along a facade, in particular in the manner of a component of a building envelope. The individual rows of construction foil strips are joined together, in particular by means of an adhesive bond, or welded together. By joining the individual strips of sheets, an attempt is made to ensure the necessary impermeability of the sealing layer.

Leaks can occur due to installation errors, but also if the sealing layer is damaged. In this context, it is problematic that the building envelope and/or the facade cladding and/or the sealing layer or the individual interconnected sheet strips are not readily visible in the installed state, since they are usually located between the outer cladding and another layer, in particular an insulation board and/or gravel fill layer and/or interior cladding panels, in particular ceiling, wall and/or floor cladding.

If moisture penetrates via the building envelope and/or the sealing layer, especially in the case of a leak, the period until the damage is detected is usually very long. Consequently, an existing increased moisture can cause damage unnoticed, which is usually noticed when the damage pattern becomes visible, especially inside the building. For example, damage caused by increased humidity can be a water stain on a wall in the interior of a building. Such a water stain then gives rise to the need for repair, and often far more areas are damaged than just the wall showing the water stain. To repair the damage, the building envelope must be exposed, at least in some areas, in order to find the leak. This usually involves a great deal of effort and very high costs.

In principle, it is known to provide a monitoring system with moisture sensors for the roofing. In addition to moisture sensors, other electrical components can also be arranged in the building envelope and/or the sub-roofing membrane, which can be used to monitor the condition. For this purpose, mostly passive sensors and/or passive electronics are used, to which electrical energy must be supplied from the outside for the detection of a physical quantity. For this purpose, it is necessary to connect the electronic unit to energy supply devices in each case.

However, connecting the monitoring systems to the necessary power supply equipment or evaluation equipment is associated with high costs. The installation of these monitoring systems is also comparatively complex. Due to the complex installations, the monitoring systems are not installed over the entire surface along the under-roofing and/or building envelope, but only in individual areas, which means, however, that if increased moisture is detected in the roofing, a time-consuming search for the leak must be carried out.

Taking into account the cost-benefit ratio, monitoring of moisture in the building envelope and/or sub-roofing is usually dispensed with in practice. Ultimately, too late detection of water damage is accepted in view of the costs of constant and/or permanent moisture monitoring.

It is now the object of the present invention to avoid the aforementioned disadvantages in the prior art or at least to reduce them substantially.

According to the invention, the aforementioned object is solved by a construction foil, in particular for use in the flat roof area, with a single-layer or multilayer structure comprising a carrier layer. The carrier layer has an electronic unit and at least one first connecting means which projects over the outer side of the carrier layer and is electrically connected to the electronic unit. According to the invention, the first connecting means is designed in such a way that the electronic unit can be detachably connected and/or electrically contacted to an external connection device via the first connecting means, preferably without tools.

The construction foil according to the invention makes it possible to establish an electrical connection, for example for power supply and/or data transmission, of external devices to the electronic unit, which may for example comprise a monitoring system, in a comparatively simple manner. Due to the tool-free connection via the first connecting means, an electrical contact to an external connection device can be made possible with a simple installation. A complex wiring of the electronic unit to further components along the entire roof system can thus be avoided. The connection device is preferably brought up to the construction foil and can provide the electrical contact through the tool-free connection. This can be used to supply power to the electronic unit.

In particular, the construction foil can be attached to an existing building envelope and preferably used for moisture monitoring and/or monitoring of other relevant condition variables. Thus, electronics provided in the under-roofing and/or the building envelope can be contacted in a comparatively simple manner. The resulting drastic simplification enables an economical use of electronic components within the sub-roofing.

Accordingly, an electrically conductive connection between electrical conductors or components of different designs in structures is preferably made possible without tools and in particular in a flat design. Accordingly, the detachable connection to the first connecting means allows simple methods to be used, which can also be carried out by personnel with little expertise under common construction site conditions. Furthermore, the connection can be separated non-destructively and reversibly, for example for maintenance work.

In addition, the time required to connect the electronic unit within the sub-roofing and/or the building envelope can be significantly reduced.

In a particularly preferred embodiment, it is provided that the first connecting means is designed as a connecting means of a complementary connecting system that can preferably be released without destruction and/or without tools. Preferably, a push-button connection, a push-button-like connection, a hook-and-loop fastener connection and/or an adhesive connection can be provided as the connection system. Accordingly, the first connecting means may be formed as a so-called male and/or female connecting means of the complementary connecting system and cooperate with the second connecting means of the connecting system, which may be arranged at the external connection device. Thereby, the first connecting means and the second connecting means of the connection device can be detachably connected to each other, preferably without tools, for electrical connection.

The aforementioned connection systems enable a connection system that is particularly flat and/or has a low installation height. The low installation height is characterized by the fact that the electronic unit is used in the roof area and/or within a building envelope, wherein the flattest possible structure is advantageous at the installation location due to a limited capacity. Easy release is made possible by the almost intuitively usable connection systems. Comparatively fast installation can thus go "hand in hand" with a reversibly releasable and, in particular, tool-free releasable connection system.

Preferably, the first bonding means protrudes between 0.5 to 15 mm, preferably between 1 to 10 mm, more preferably between 2 to 6 mm, beyond the outer side of the carrier layer. The first bonding means may also protrude beyond the outer side of the layer structure.

It is particularly preferred that the electronic unit is printed on the outer side of the carrier layer. Printing the electronic unit ensures a high degree of individuality, a low build height and/or a manufacturing process associated with low manufacturing costs. In particular, the printing of the electronic unit onto the carrier layer is carried out during the manufacturing process of the construction foil, which in particular can be carried out continuously as an inline process.

In a particularly preferred embodiment, it is further provided that the electronic unit has at least one sensor, preferably a moisture sensor, and/or at least one conductor track. Preferably, the first connecting means is electrically conductively connected to the at least one conductor track. Alternatively or additionally, it can be provided that the sensor is electrically conductively connected to at least one conductor track and/or the first connecting means. In particular, an electrical power supply to the electronic unit, in particular to the sensor, can be enabled via the first connecting means. Accordingly, when the sensor is designed as a passive sensor, an energy supply is provided for, preferably continuous, monitoring.

Furthermore, the construction foil can have between 1 and 50, preferably at most 30, further preferably at most 20, and in particular between 1 and 20, first connecting means. For example, at least one first connecting means for electrical connection can be provided per conductor track and/or per sensor of the electronic unit. Alternatively or additionally, it can also be provided that a first connecting means is electrically connected to at least two sensors and/or at least two conductor tracks.

In particular, the carrier layer is formed as a, preferably waterproof, film layer. The carrier layer can have as material a plastic, preferably a thermoplastic, further preferably polypropylene, polyethylene and/or polyethylene terephthalate (PET), and/or consist thereof. In particular, the carrier layer is formed as a PET film.

In a further preferred embodiment of the invention, the layer structure may comprise at least one textile layer firmly bonded to the carrier layer. In particular, a nonwoven layer and/or a fabric layer may be provided as the textile layer. Preferably, the electronic unit may be provided between the textile layer and the carrier layer. Thus, the electronic unit may in particular have been printed onto the carrier layer and, moreover, may be connected to the textile layer, in particular over the entire surface.

Accordingly, electrical contacting of the electronic unit enclosed in the layer structure of the construction foil is enabled via the first connecting means. In further embodiments, the first connecting means can also project beyond the outer side of the textile layer.

Alternatively or additionally, it can be provided that the textile layer has a recess in the area of the first connecting means. This recess can serve to ensure access to the first connecting means from the outside. Thus, the first connecting means can be contacted electrically by the external connection device.

In addition, in a further preferred embodiment, it is provided that the first connecting means protrudes over the outer side of the textile layer facing away from the carrier layer. Ultimately, this enables electrical contacting of the first connecting means to be ensured even in the installed state of the construction foil.

In a further preferred embodiment of the invention, it is provided that the width of the carrier layer need not correspond to the width of the textile layer. Thus, the carrier layer may ultimately extend over only a portion of the width of the textile layer. In particular, however, it is provided that the carrier layer and the textile layer have an elongated shape and, in particular, the same length.

Preferably, the width of the carrier layer extends over at least 3%, preferably between 3% to 50%, more preferably between 5% to 25% and in particular between 8% to 16%, of the width of the textile layer.

Furthermore, the carrier layer arranged on the textile layer may be spaced apart from the outer edges of the textile layer. In particular, the carrier layer can be arranged centrally on the textile layer so that there is preferably at least substantially the same distance from the respective outer edges of the textile layer.

It is particularly preferred that the outer edges of the carrier layer and the textile layer are at least substantially parallel to each other. Alternatively or additionally, it may be provided that the longitudinal axis of the carrier layer is at least substantially parallel to the longitudinal axis of the textile layer.

In a further preferred embodiment, it is provided that the layer structure has at least one further layer for forming the construction foil as a roofing membrane, roofing foil, flat roofing membrane, facade membrane and/or vapor barrier and/or sub-roofing membrane, in particular underlayment and/or sarking membrane. The at least one further layer can in particular be designed as a functional layer. The at least one further layer can extend in particular over the width of the carrier layer and/or over the width of the textile layer.

Furthermore, the present invention relates to a system comprising at least one construction foil according to one of the aforementioned embodiments and at least one external connection device for electrically contacting the at least one first connecting means of the construction foil. The connection device comprises at least one second connecting means complementary to the first connecting means. The first and the second connecting means are detachably connectable to each other, preferably without tools.

In this context, it is understood that with regard to preferred embodiments and advantages of the system according to the invention, reference may be made to the preceding explanations concerning the construction foil according to the invention, which also apply in the same way to the system according to the invention. In order to avoid repetition, the following explanations in this respect will be dispensed with.

The system according to the invention enables the integration of an electronic unit in the roof structure, in particular in the area of a flat roof, and/or in the area of a building envelope and, in particular, a comparatively simple way of electrical contacting of the electronic unit. Via the connection, which can be detached without tools, a simple installation can be carried out at the installation location. Thus, the connection device can enable contact to further external electrical components.

In particular, it is provided that the first and the second connecting means have a low build-up height in the connected state. In particular, the build-up height does not exceed 1 cm, preferably the build-up height is less than or equal to 0.5 cm, further preferably less than or equal to 0.25 cm.

It is particularly preferred that an evaluation device connected or connectable to the connection device is provided, preferably for evaluating the measurement results recorded by the sensor of the electronic unit. The evaluation device can be connected directly or indirectly to the connection device. Alternatively or additionally, an energy supply device connected or connectable to the connection device can be provided. In particular, the power supply of the electronic unit can be ensured via the power supply device.

In another preferred embodiment of the present invention, it is provided that the connecting means comprises at least one conductor cable and/or at least one connecting conductor track for electrical connection to the second connecting means.

Preferably, the connection device has at least one contacting means, preferably a male or female contacting means of a plug connection to be formed, for connecting further electrical components, for example a power supply device or the like. The contacting means can be electrically connected to the second connecting means via at least one conductor cable. In principle, a distinction is made in electrical plug connections between the male part of a plug connection, which in particular has contact openings facing outwards, and the female part, which in particular has contact openings facing inwards. Ultimately, therefore, the first connecting means can be brought into electrical connection with a plug-in contact—namely the contacting means of the connection device—via the second connecting means. In this way, in particular, indirect contacting of the construction foil to a plug-in connection is made possible. For example, the connecting means can bridge a distance until a sufficiently large clearance is achieved for arranging the plug connection. For example, the contacting means of the connection device can be freely accessible from the outside when the construction foil is installed.

In a further, particularly preferred embodiment, the connection device is provided on a further construction foil. In particular, the connection device is arranged—preferably for overlapping installation—on the outer side of the carrier layer opposite the outer side having the first connecting means. In particular, the connection device of the further construction foil is electrically connected to the first connecting means and/or the electronic unit of the further construction foil. Preferably, it is thus possible to achieve an electrical connection between two directly adjacent construction foils. The connection between the first connecting means of the first construction foil and the second connecting means of the connection device of the further construction foil thus ensures electrical contact between the first construction foil and the further construction foil.

Preferably, an electrical connection of the construction foils to one another can thus be made possible in a comparatively simple manner. In particular, a comparatively large area of the roof structure can be equipped with the electronic unit, while at the same time ensuring economical use of the entire system.

In this context, it is understood that the construction foil can be connected both to a further construction foil via the first connecting means and also to a connection device, which can be connected to an evaluation device. In this way, the construction foil can ultimately be connected to at least two connection devices, although each connection device does not have to be integrated into a further construction foil. In particular, with such an electrical connection of the construction foils, it is possible according to the invention that, in the case of a plurality of construction foils, at least one connection device connected to the power supply device is connected, the power supply of the further construction foils being made possible via the electrical contact of the construction foils to one another.

According to the invention, it is particularly possible to provide a connection method that can be used both to connect the construction foils to each other and to connect external electrical components.

Particularly preferably, the first and second connecting means can be releasably connected to one another in a form-fitting, friction-fitting, material-fitting and/or latching manner. In particular, a tool-free releasable connection is made between the connecting means. In this way, the electrical contact can be established with little effort, particularly at the installation site.

In a further preferred embodiment, it is provided that the first and second connecting means form a complementary connecting system that can preferably be released non-destructively and/or without tools. In further embodiments, a push-button connection, a push-button-like connection, a hook-and-loop-fastening connection and/or an adhesive connection may be provided as the connection system. In particular, the aforementioned connection methods can be used almost intuitively. The simple connection techniques can prevent installation errors or errors during electrical contacting and commissioning of the electronic unit.

Furthermore, in another preferred embodiment, the second connecting means is provided in a housing of the connection device. The housing of the connection device can, in particular, simplify the electrical contact between the first connecting means and the second connecting means, in particular by allowing the housing to act as an abutment. For example, in the case of a push-button connection system in use, the counter-pressure required when the components are brought together can be enabled via the housing. Preferably, the connection between the first connecting means and the second connecting means produces an acoustic sound, in particular a so-called "click sound", which indicates to the installer that the connection between the first and the second connecting means has been made.

The construction foil according to the invention can be produced in particular in such a way that first the carrier layer is printed with the electronic unit. Preferably, the carrier layer with the printed electronic unit can then be laminated with the textile layer. The construction foil can then be cut to length into the individual construction foil sections.

After the individual construction foil sections are available, the connecting means, preferably the first connecting means, can be integrated into the construction foil.

In connection with the present invention, it is understood that the construction foil may in particular comprise both the first connecting means and the second connecting means, in particular when the construction foil is connectable to a plurality of construction foils. Thus, the construction foil may comprise the first connecting means for electrical connection to a connection device and, at the same time, a connection device connectable to a first connecting means of a further construction foil.

Furthermore, in another preferred embodiment, it is provided that the carrier layer has a width between 1 to 100 cm, preferably between 10 to 50 cm, more preferably between 13 to 20 cm. Alternatively or additionally, it may be provided that the textile layer has a width between 0.5 to 3 m, preferably between 1 to 2 m. Preferably, the carrier layer and the textile layer have the same length and/or both run in the longitudinal direction and/or are elongated. The length of the construction foil and/or the carrier layer and/or the textile layer can be between 1 m to 50 m, preferably between 1.5 m to 10 m.

Preferably, the construction foil has a multi-layered layer structure comprising the carrier layer and the textile layer, wherein an electronic unit comprising at least one moisture sensor is printed on the outer side of the carrier layer. In particular, the textile layer is water-permeable, preferably water-absorbent, wherein the electronic unit is provided between the carrier layer and the textile layer. In particular, the moisture sensor is in direct contact with the textile layer, in particular wherein the moisture sensor is arranged, preferably directly, on the textile layer.

Advantageously, it is possible to provide a printed moisture sensor. In particular, this makes it possible to drastically reduce the manufacturing costs for a construction foil according to the invention compared with the state of the art, since the moisture sensor can ultimately be produced during the manufacture of the construction foil, preferably in an inline process. In particular, the moisture sensor can be printed onto the carrier layer together with the other components of the electronic unit.

Furthermore, the construction foil according to the invention can advantageously be used to ensure monitoring of the moisture in the roof structure from an economic point of view, especially in the flat roof area. In this way, the undesired penetration of moisture in the roof structure can be detected in good time, so that in particular long-term damage due to water damage can be prevented.

By printing the moisture sensor according to the invention, a plurality of moisture sensors can be provided along the length of the construction foil with low manufacturing costs. This enables comparatively accurate detection of a leak, since the location of the water penetration can be determined by identifying the moisture sensor that detects the moisture.

The carrier layer ensures in particular that the moisture sensor can also detect moisture in the immediate vicinity, since in particular moisture transport along the textile layer is enabled. The moisture sensor is in contact with the textile layer in such a way that the moisture can be localized. Thus, according to the invention, it is possible to ensure detection of the moisture at the moisture sensor via the two-dimensional covering with the textile layer.

In addition, the printed moisture sensor makes it possible to achieve a comparatively low installation height of the electronic unit, in particular with the electronic unit having a height of between 0.1 mm and 2 cm, preferably between 1 mm and 1 cm, and more preferably between 2 mm and 5 mm. The comparatively low construction height also makes it possible to lay further layers over the construction foil without interference, so that in particular there are no interfering relief contours of the electronic unit.

Furthermore, the electronic unit according to the invention has a high mechanical stability, in particular wherein the electronic unit is also designed to be rollable and/or bendable, which in particular enables easy laying of the construction foil.

In a particularly preferred embodiment, the humidity sensor is designed as a resistive humidity sensor. Alternatively or additionally, the humidity sensor can also be designed as a capacitive humidity sensor.

Preferably, the resistive humidity sensor is formed by at least two adjacent electrically conductive measuring conductor tracks for resistive humidity measurement. At least one water line can be provided between the at least two electrically conductive measuring conductor tracks. The fact that water or moisture is present in the water line between the electrically conductive measuring conductor tracks makes it possible to influence the electrical resistance in such a way that moisture can be detected via the moisture sensor. In this context, according to the invention, the physical principle can be exploited that the electrical resistance changes when water and/or moisture penetrates a water line—which is formed between two directly adjacent measuring conductor tracks. Thus, the change in ohmic resistance is used to detect the moisture.

Furthermore, in another preferred embodiment of the invention, it is provided that the at least two measuring conductor tracks of the humidity sensor mesh with each other. Alternatively or additionally, it can be provided that the at least two measuring conductor tracks of the moisture sensor each have a plurality of protruding fingers, wherein, preferably, the fingers of the measuring conductor tracks can interlock and/or mesh with one another. In particular, the at least one water line for resistive moisture measurement can be formed between two directly adjacent fingers of the measuring conductor tracks. Thus, in particular, an at least substantially labyrinthine structure of the moisture sensor can be obtained.

In particular, the humidity sensor is designed as a rounded, especially at least substantially circular, sensor field. However, other shapes of the sensor field are also possible.

In any case, it should be ensured that the at least two measuring conductor tracks are arranged meshing with each other in a sensor field.

Preferably, the moisture sensor is connected to at least one conductor track of the electronic unit, preferably to at least two conductor tracks, in particular between 3 to 8 conductor tracks. In particular, at least one measuring conductor track is electrically connected to at least one conductor track of the electronic unit, wherein alternatively or additionally at least one further measuring conductor track can be electrically connected to at least one, preferably to at least two, further preferably between 3 to 8, conductor tracks. In particular, one measuring conductor track can be connected to one conductor track and a further measuring conductor track can be connected to a plurality of conductor tracks, in particular so that resistive moisture measurement can be ensured via the intermeshing measuring conductor tracks.

Furthermore, the carrier layer can alternatively or additionally be open to diffusion, in particular permeable to water vapor, and/or waterproof and/or breathable. Alternatively or additionally, it can be provided that the carrier layer is designed to be diffusion-tight, diffusion-inhibiting, water vapor-impermeable and/or waterproof. The formation of the carrier layer can be carried out in particular as a function of the place of use and/or the formation of the construction foil. For example, the construction foil can be arranged on webs of a building envelope. Depending on the arrangement in this respect, the carrier layer can be designed to be either open to diffusion or permeable to diffusion. In particular, the carrier layer is designed in such a way that the moisture sensor can detect the penetration of unwanted moisture via the moisture transport along the textile layer.

In addition, the textile layer, which is preferably in the form of a nonwoven layer, can in particular comprise hydrophilic fibers—that is, in particular water-absorbing fibers. In particular, the textile layer can be composed of hydrophilic fibers, which in particular comprise polyethylene terephthalate (PET). Alternatively or additionally, it may be provided that the fibers of the textile layer comprise a hydrophilic coating, in particular wherein the fibers comprise and/or consist of polyethylene terephthalate (PET) as material. The hydrophilic coating can consequently ensure that effective moisture transport can be guaranteed along the textile layer.

The hydrophilic design of the textile layer makes it possible in particular to improve the transport of moisture and/or water along the textile layer compared to tiles known in the state of the art. Thus, the detection of moisture and/or water according to the invention can also be improved to the extent that even a small amount of moisture and/or water that is in contact with the textile layer can be detected by the moisture sensor according to the invention.

In a further preferred embodiment, it may be provided that the textile layer is formed as a nonwoven layer, preferably as a thermally bonded and/or needle-punched and/or wet-blast bonded nonwoven layer. Furthermore, the textile layer may alternatively or additionally comprise a polyolefinic nonwoven, a natural fiber nonwoven, a polypropylene spun-bonded nonwoven, a polyamide nonwoven, a polylactide nonwoven (PLA nonwoven) and/or a polyethylene terephthalate nonwoven and/or be produced as a staple nonwoven and/or as a close-meshed knitted fabric.

Furthermore, in a further preferred embodiment of the present invention, it is provided that a plurality of moisture sensors, in particular equally spaced, are present along the length of the construction foil. In particular, directly adjacent moisture sensors may have a distance of between 10 cm to 5 m, preferably between 20 cm to 3 m, more preferably between 40 cm to 1.5 m. Alternatively or additionally, it may be provided that the distance of directly adjacent moisture sensors is at least 5 cm, preferably at least 10 cm, more preferably at least 20 cm and/or smaller than 5 m, preferably smaller than 3 m, more preferably smaller than 1.5 m. The distance of the moisture sensors may depend in particular on the desired accuracy of the localization of a possible leak in the roof structure. The closer the moisture sensors are arranged, the more accurately a leak can be detected. However, according to the invention, even with a larger distance between directly adjacent moisture sensors, it is possible to at least substantially reliably detect the penetration of moisture in the area of the construction foil by using the moisture transport along the textile layer.

In a further preferred embodiment, it is provided that the, in particular minimum, distance between directly adjacent fingers of the sensor array and/or the, in particular maximum, width of at least one water line formed between the at least two measuring conductor tracks is less than 1 cm, preferably less than 0.5 cm, more preferably less than 0.3 cm, preferably between 1 mm to 10 mm. Ultimately, the width between the immediately adjacent fingers of the measuring conductor tracks can also vary. In particular, the distance is chosen such that the resistive moisture measurement can be detected by the moisture sensor when moisture and/or water penetrates the water line due to the change in ohmic resistance.

In a further preferred embodiment, it is provided that the layer structure has a further textile layer, in particular a nonwoven layer. The further textile layer can be arranged on the side of the construction foil opposite the textile layer. Alternatively or additionally, it can be provided that the further textile layer is arranged on the side of the carrier film facing away from the electronic unit. The further textile layer can in particular improve the mechanical stability of the construction foil.

Furthermore, it can be provided that the layer structure is designed in two layers and consists of the carrier layer and the textile layer. In this way, a comparatively simple structure of the construction foil can be provided, with which in particular already laid sheets and/or sheets to be laid of a building envelope and/or a sub-roofing can be equipped with a monitoring system for moisture monitoring.

Furthermore, the present invention relates to a use of at least one construction foil according to one of the preceding embodiments, preferably in the roof structure, as a breakthrough element comprising at least one breakthrough of the construction foil. In particular, the breakthrough element is for moisture monitoring and/or for enclosing at least one breakthrough body guided at least in sections through the breakthrough and/or arranged in the breakthrough. In particular, a flat roof breakthrough body is provided as the breakthrough element and/or the breakthrough element is used in the flat roof structure. A drain, in particular a gully and/or a flat roof drain, may be provided as the breakthrough body. Alternatively or additionally, it is also possible that the breakthrough body is formed by a ventilator, in particular a ventilation pipe, preferably for the flat roof area.

In addition to the use of the construction foil as a breakthrough element, it is particularly preferred that the construction foil and/or the breakthrough element is also used for the formation of details, preferably in the roof area. In particular, the construction foil is then used in the area of the detail formation for moisture monitoring in the roof structure. Detail formation means in particular connections, in particular roof, wall, door, window and/or roof edge closures.

Preferably, the breakthrough element can be considered as a sleeve element for enclosing the breakthrough body and, in particular, for sealing the breakthrough body.

The use of the construction foil as a breakthrough element is of particular inventive significance. For example, the construction foil according to the invention can be used particularly advantageously as a breakthrough element, since the moisture sensor integrated in the construction foil can in particular ensure prompt and reliable detection of moisture penetration. Particularly in the area of breakthroughs used for breakthrough elements, there are places in the roof structure that could lead to moisture penetrating into the roof structure, but this must be avoided. By forming the moisture sensor on the construction foil, it is now possible to use the construction foil in the area of the breakthrough body as a breakthrough element and thus in particular to determine whether correct sealing is ensured for the breakthrough element and thus for the entire roof structure. Accordingly, it is precisely the critical weak points in the roof structure that can be monitored, especially in the long term.

The penetration element can have different shapes, for example, "round" vents as well as "round" gullies are conceivable—i.e. those which have an at least essentially circular cross-section—but also rectangular penetrations, such as skylight domes or the like, can be sealed and/or monitored by the penetration element according to the invention and thus be arranged in the roof structure.

In this context, it is understood that the aforementioned explanations of advantages, preferred embodiments and the like relating to the construction foil can also apply in the same way to the use of the construction foil as a breakthrough element according to the invention, in particular without the need for further explanation.

The breakthrough element can have different shapes, so both elongated breakthrough elements and rectangular breakthrough elements, in particular square breakthrough elements—at least as seen in cross-section—are possible.

In a particularly preferred embodiment, it is provided that the at least one moisture sensor is arranged adjacent to the breakthrough of the construction foil. In particular, the moisture sensor is spaced from the breakthrough by at least 0.5 cm, preferably at least 1 cm, more preferably between 2 cm to 100 cm. In particular, at least 2, preferably at least 3, preferably between 3 to 20, more preferably between 4 to 8, moisture sensors are arranged adjacent to the breakthrough and are electrically interconnected, in particular via conductor tracks. Immediately adjacent humidity sensors can also be spaced apart from one another, in particular with the distance between immediately adjacent humidity sensors being between 1 cm to 200 cm, preferably between 2 cm to 50 cm. The plurality of moisture sensors ensures a close-meshed monitoring network (around the breakthrough), so that the ingress of water can be detected in particular promptly in the event of a leaking breakthrough element. This means that possible structural damage due to moisture penetration can be prevented at an early stage, since the leak can be localized.

Preferably, the conductor tracks connecting the humidity sensors are arranged around the breakthrough. In particular, the breakthrough does not break through the conductor tracks or the moisture sensors. Thus, a breakthrough element can be provided that has, preferably in the central region, the possibility of arranging a breakthrough or the breakthrough itself, while ensuring that the breakthrough does not interfere with the current carrying of the conductor tracks. For example, an area can be predetermined which can be cut and/or punched in at the user to form the breakthrough, so that the breakthrough of the construction foil can be formed. Accordingly, the breakthrough can also be introduced at the user's end, which can ensure a high degree of flexibility and/or adaptability of the breakthrough element according to the invention with respect to different outer dimensions of the breakthrough body. This also makes it possible for the breakthrough element to be arranged as closely as possible to the breakthrough body.

According to the invention, in a preferred embodiment, a sealing function can be provided by the breakthrough element itself. However, it may also be provided that further construction foil sections, sealing sheets or the like are connected to the breakthrough element for sealing the breakthrough element in the roof structure. Finally, the breakthrough element according to the invention can provide a sensor area that can detect the penetration of moisture into the sealed area. Accordingly, it can be provided that the breakthrough element as such can be arranged in the already sealed area—that is, for example, facing away from the weather side under the sealing film and/or the further construction foil section.

In further embodiments, it can also be provided that the sealing function is ensured via the construction foil itself, in particular by forming the carrier layer in the construction foil watertight and/or by providing at least one further layer that leads to the formation of the construction foil as a roofing membrane and ultimately ensures the sealing function, as this has already been explained at the beginning.

Preferably, the carrier layer has a first breakthrough which is formed in such a way that it is at least substantially flush with the breakthrough body and/or is led up at least in regions along the outer side of the breakthrough body and preferably bears at least substantially tightly and/or sealingly against the outer side of the breakthrough body. It may be provided that the carrier layer is connected to the outer side of the breakthrough body at the edges of the first breakthrough via a connecting means, for example an adhesive connection or the like.

Preferably, the textile layer has a further breakthrough which is enlarged compared to the first breakthrough of the carrier layer. Alternatively or additionally, it can be provided that the textile layer has incisions, preferably a cross incision and/or crossed incisions. In particular, the incisions can be formed such that nonwoven sections are led up along the outer side of the breakthrough body. In further embodiments, it may also be provided that the further breakthrough corresponds at least substantially to the dimensions of the first breakthrough. In principle, however, different formations of the first and the further breakthrough are also possible. The first and the further breakthrough ultimately together form a breakthrough of the construction foil.

As explained above, the breakthrough body can be connected and/or bonded to the construction foil, in particular the carrier layer. The connection can in particular be designed in such a way that a watertightness, an airtightness and/or a sealing can be ensured. In this context, it is understood that the breakthrough body is not part of the breakthrough element, but can be connected to the breakthrough element. Both the breakthrough body and the breakthrough element may be arranged in the roof area.

The breakthrough body can have different dimensions. A flat roof breakthrough body is particularly preferred. The breakthrough body and/or the at least one breakthrough of the construction foil may have a diameter, in particular an outer diameter, of at least 20 mm, preferably at least 40 mm, more preferably between 50 mm to 100 mm, preferably between 100 mm to 300 mm. In this context, it is understood that the diameter indicates in particular the maximum diameter. The breakthrough may, but need not, be at least substantially circular in cross-section.

Insofar as the breakthrough body has an at least substantially rectangular cross-sectional shape, as for example in the case of a skylight dome, it may be provided that the breakthrough body has a maximum length of at least 1 m, preferably between 1 to 2 m. Alternatively or additionally, it may be provided that the breakthrough body has a maximum width of at least 1 m, preferably between 1 to 2 m.

The breakthrough element can also be connected to further webs of the construction foil, in particular via the connection system described below. Ultimately, the breakthrough element is also a construction foil, which can be designed in particular in accordance with the preferred embodiments described above and below. The breakthrough element is ultimately a particularly advantageous possible application of the construction foil according to the invention, which in particular has an independent inventive significance, since this particular application results in a large number of advantages.

Furthermore, in a further preferred embodiment, it is provided that the breakthrough element is formed in at least two parts. In particular, at least one moisture sensor can be arranged on each component of the breakthrough element. The sections or components of the breakthrough element can in particular be electrically connected to one another, in particular via a connection system to be described below. Thus, the breakthrough element can preferably be formed by sections of the construction foil which are separate from one another and which can preferably be arranged on the breakthrough element. Such a design is particularly advantageous for breakthrough elements having a comparatively large outer diameter—that is, an outer diameter of more than 1 m. Thus, monitoring of moisture penetration in the case of larger breakthrough elements can be ensured in particular by a multi-part construction foil forming the breakthrough element or individual construction foil sections forming the breakthrough element.

In particular, a roof structure is preferably provided for a flat roof. The roof structure comprises a construction foil and/or a breakthrough element according to one of the preceding embodiments, wherein—at least in the installed state of the construction foil—the moisture sensor is arranged on the construction foil on the upper side, facing the weather side, or on the lower side, facing away from the weather side.

With regard to preferred embodiments and/or advantages, reference may be made in particular to the preceding explanations concerning the construction foil according to the invention, which also apply in the same way to the roof structure.

The roof structure characterizes in particular the installation location of the construction foil and the orientation of the moisture sensor, wherein the moisture sensor can be arranged at different locations and/or on different outer sides of the construction foil depending on the installation location. In particular, when using the construction foil in the flat roof area, it is intended that the moisture sensor is arranged on the underside of the construction foil and can ensure moisture detection in particular via contact with the textile layer.

Furthermore, it is understood that any intermediate intervals and individual values are included in the above-mentioned intervals and range limits and are to be regarded as disclosed as essential to the invention, even if these intermediate intervals and individual values are not specifically indicated.

Further features, advantages and possible applications of the present invention will be apparent from the following description of examples of embodiments based on the drawing and the drawing itself. In this context, all the features described and/or illustrated constitute the subject-matter of the present invention, either individually or in any combination, irrespective of their summary in the claims or their relation back.

Figure 2:
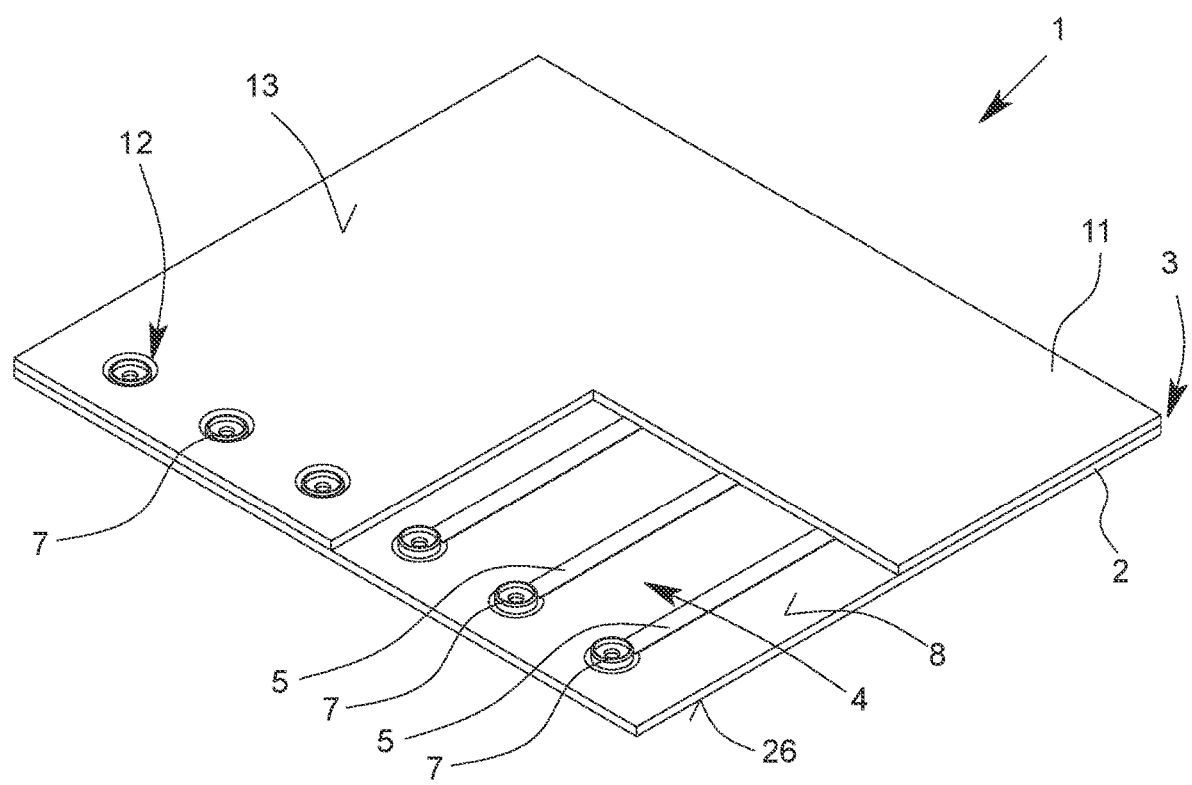
Figure 3:
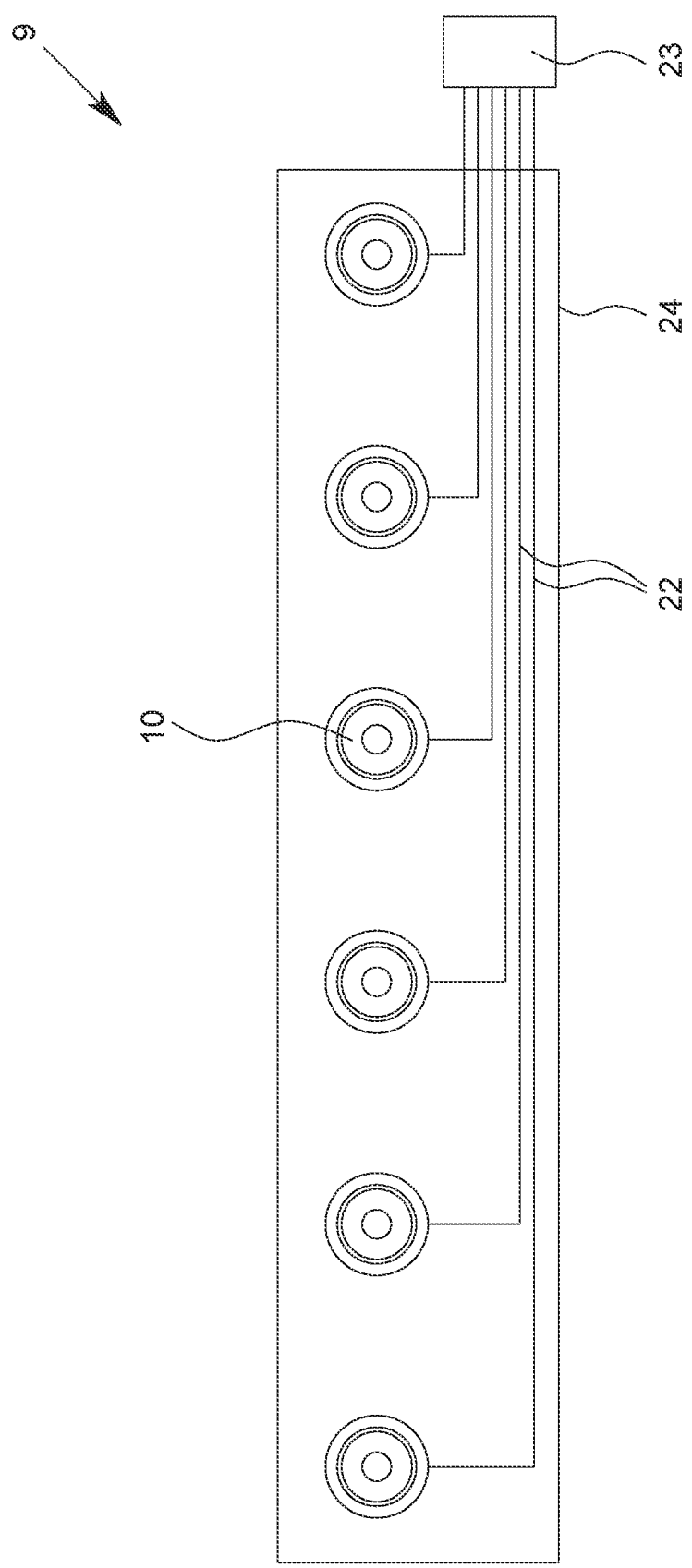
Figure 4:
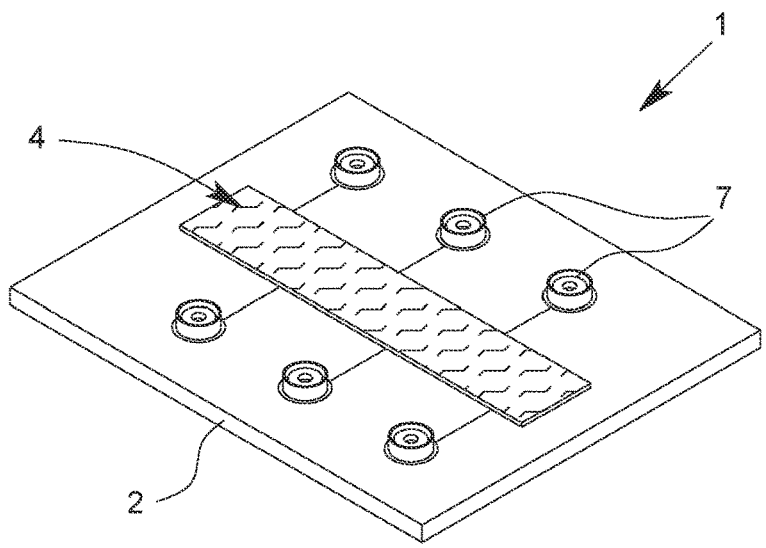
Figure 5:
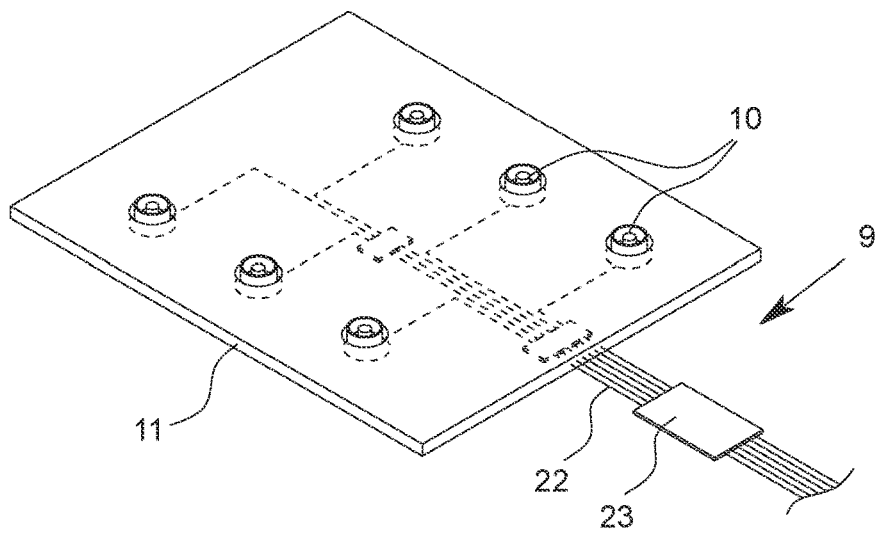
Figure 6:
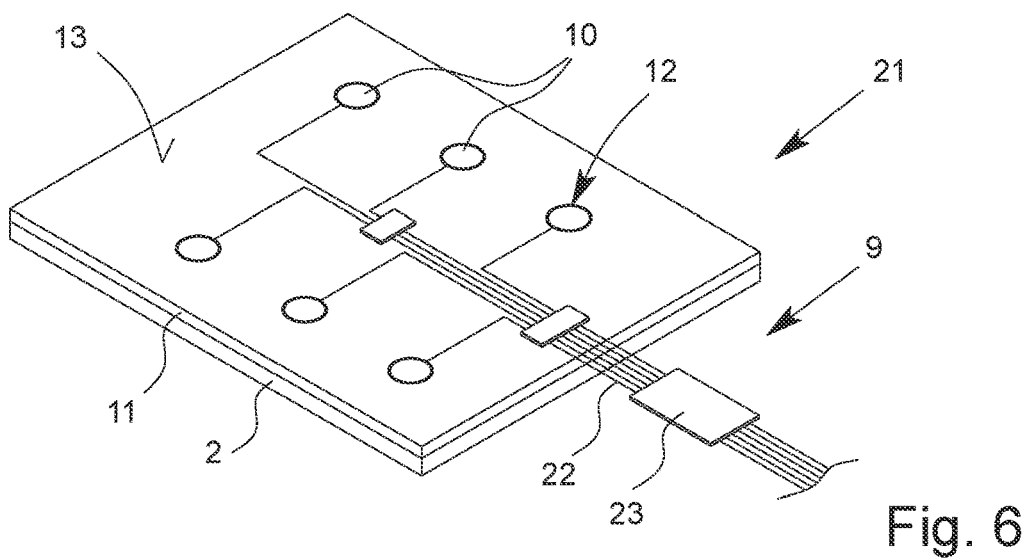
Figure 7:
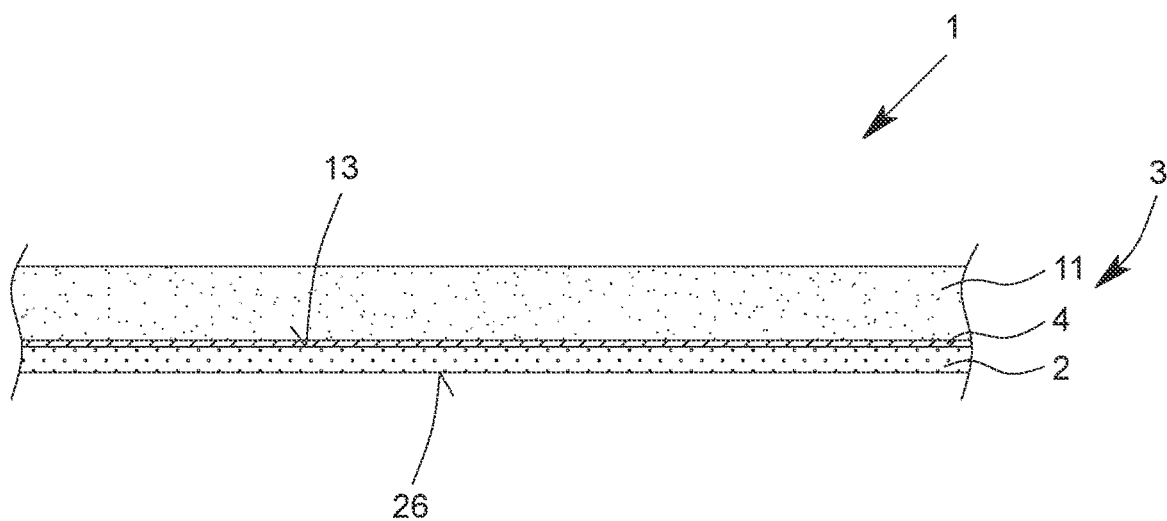
Figure 8:
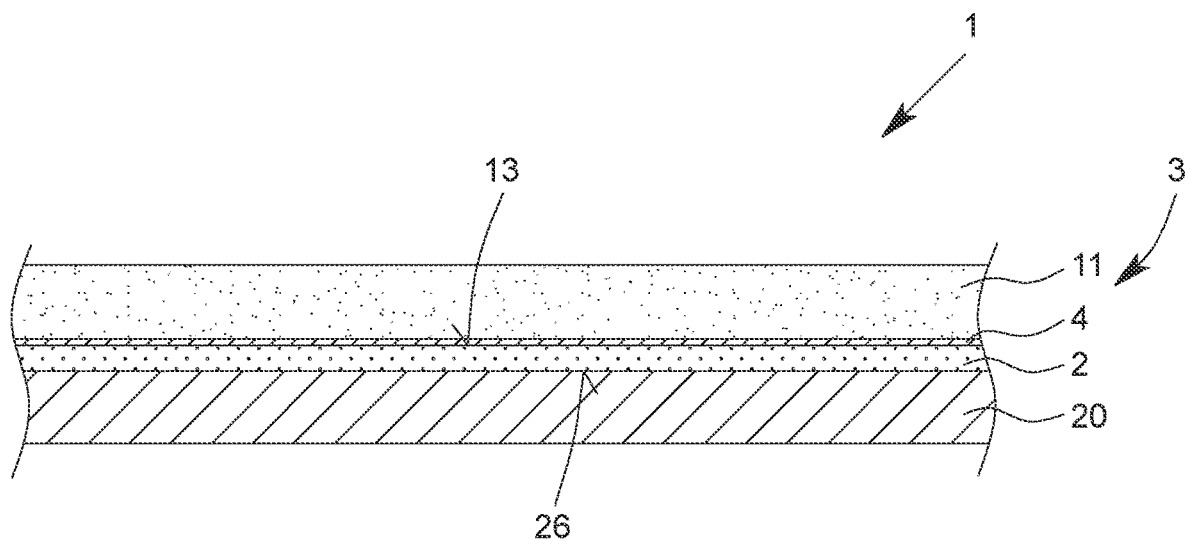
Figure 9:
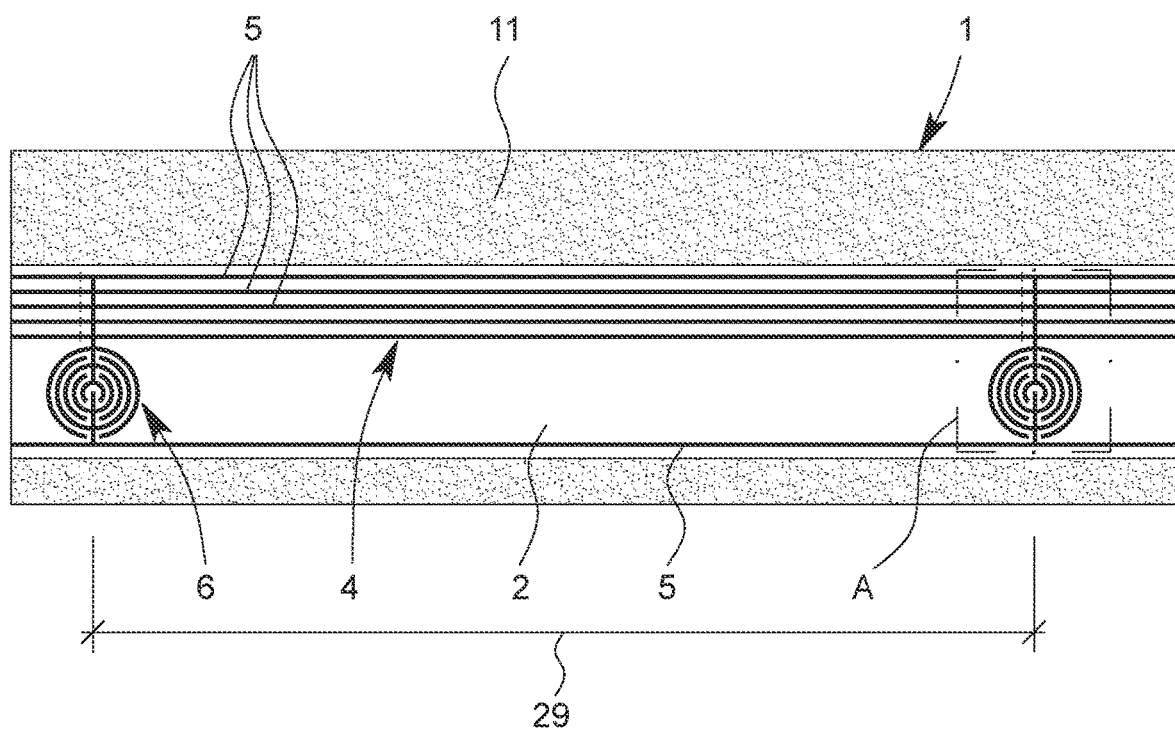
Figure 10:
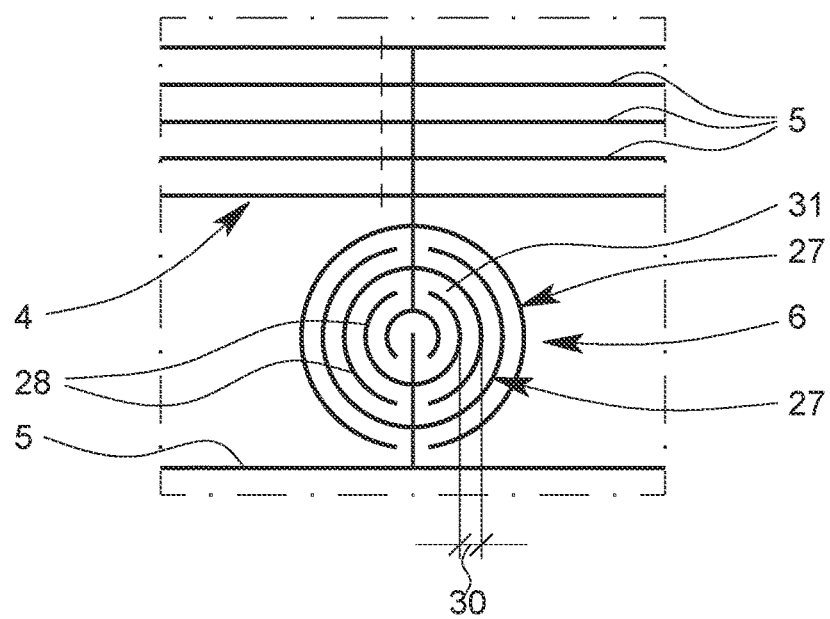
Figure 11:
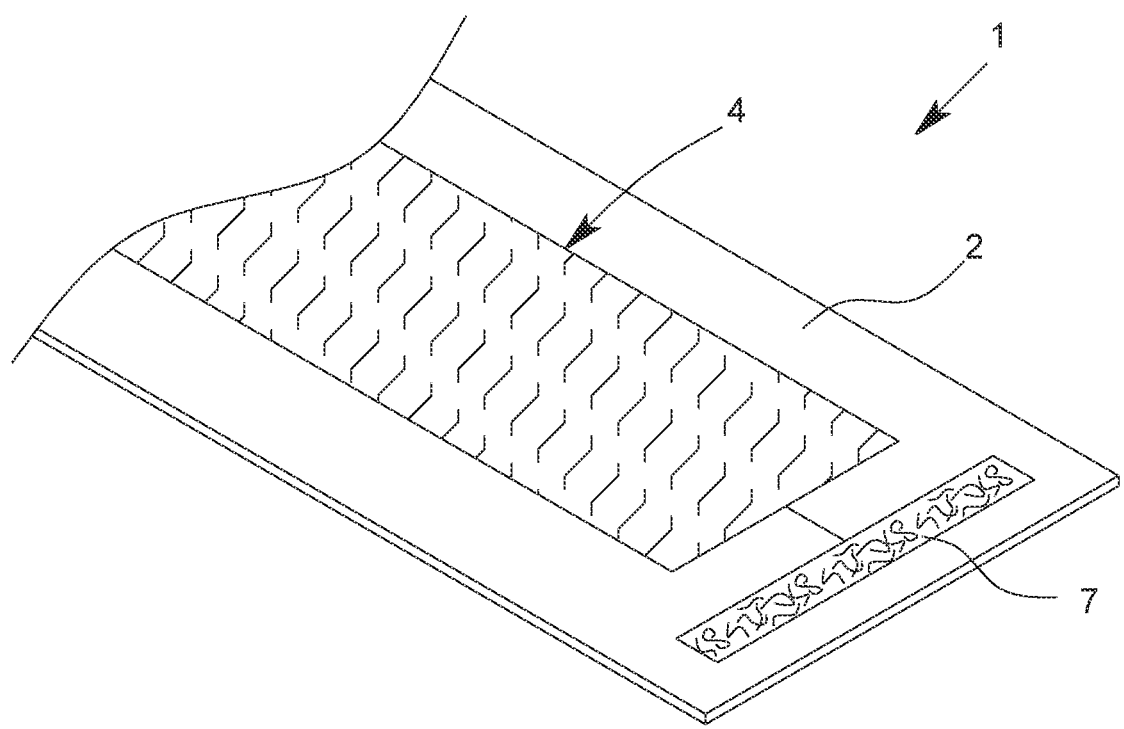
Figure 12:
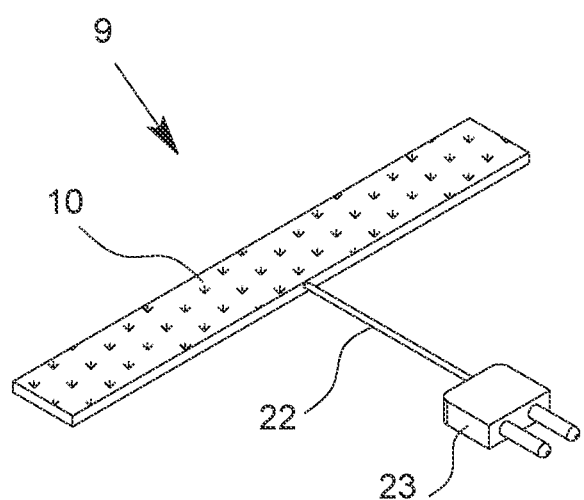
Figure 13:
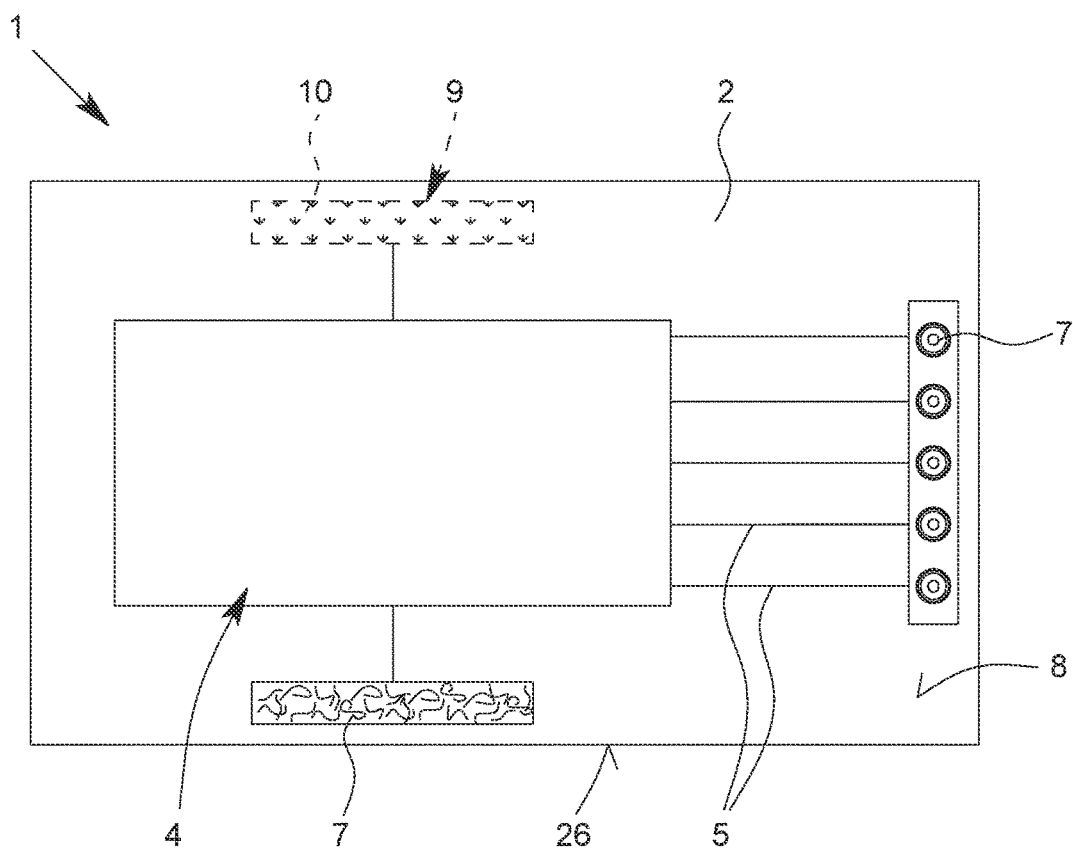
Figure 14:
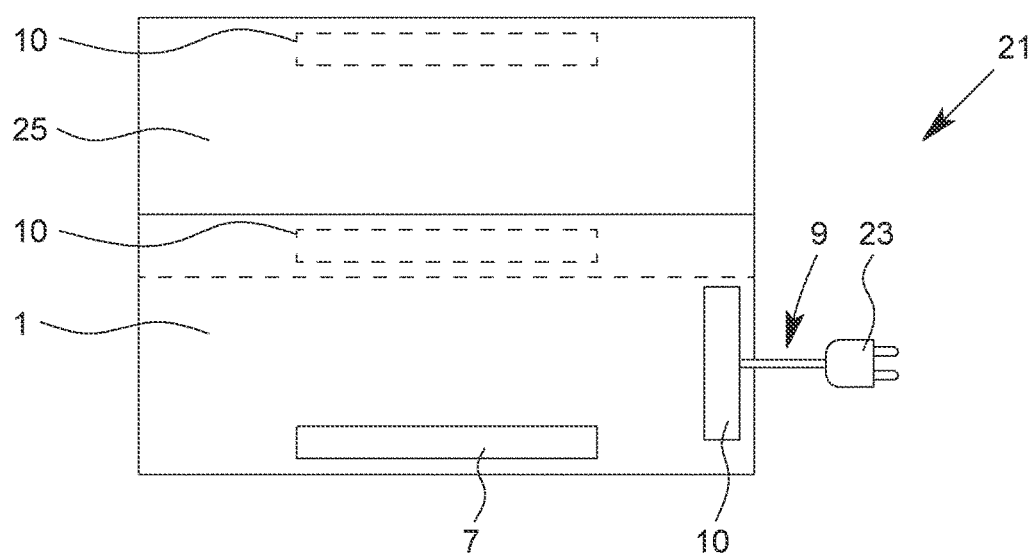
Figure 15:
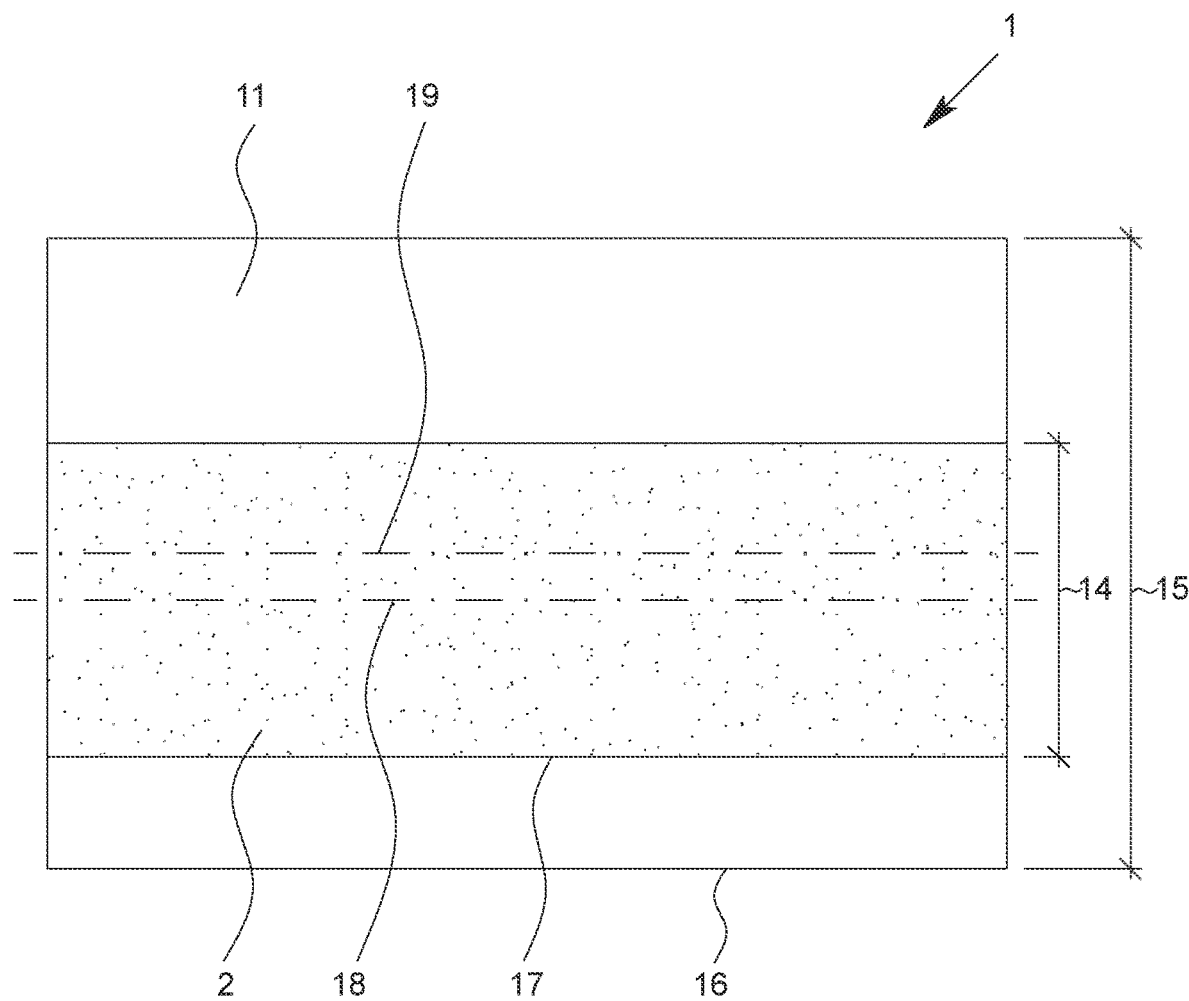
Figure 16:
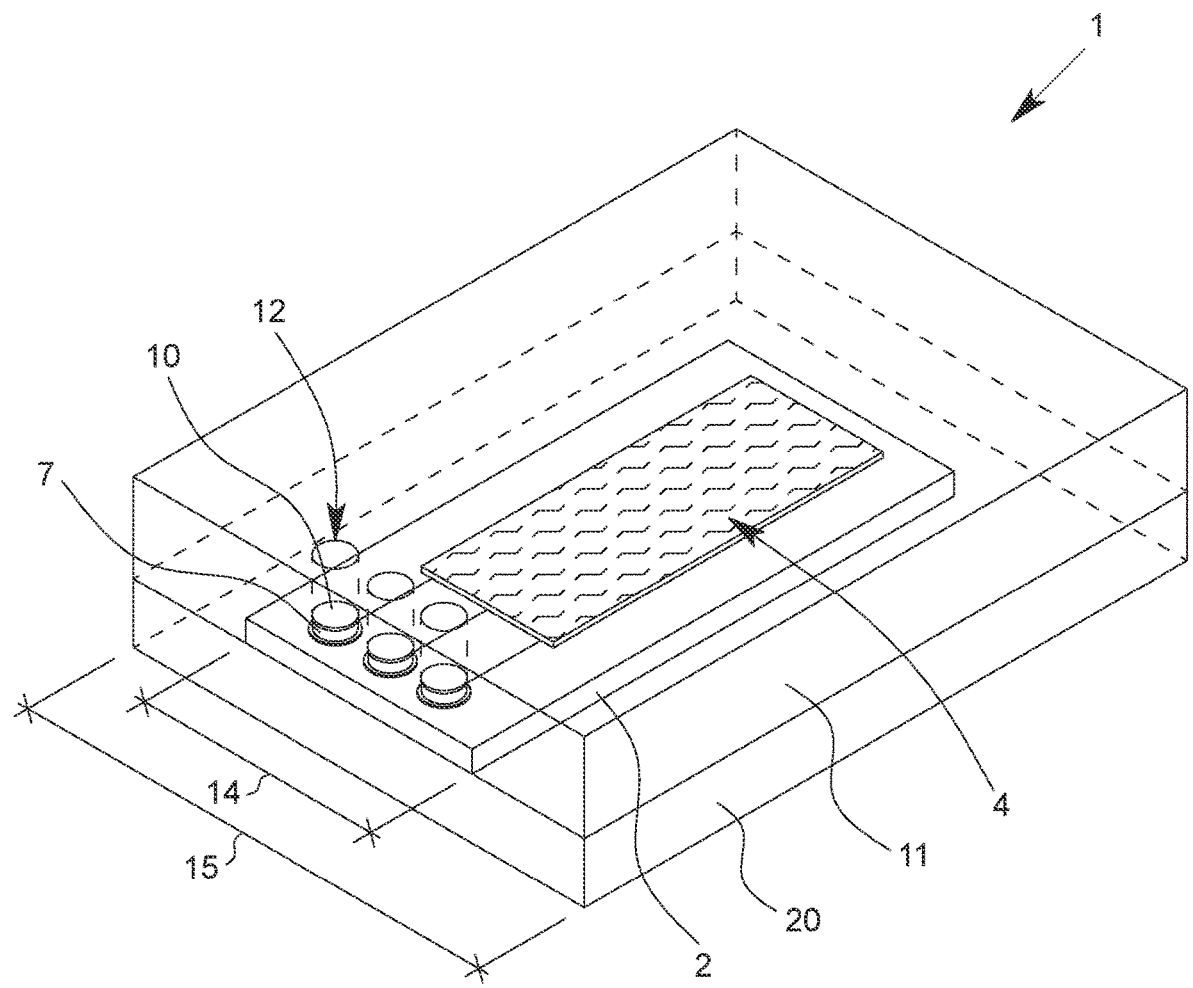
Figure 17:
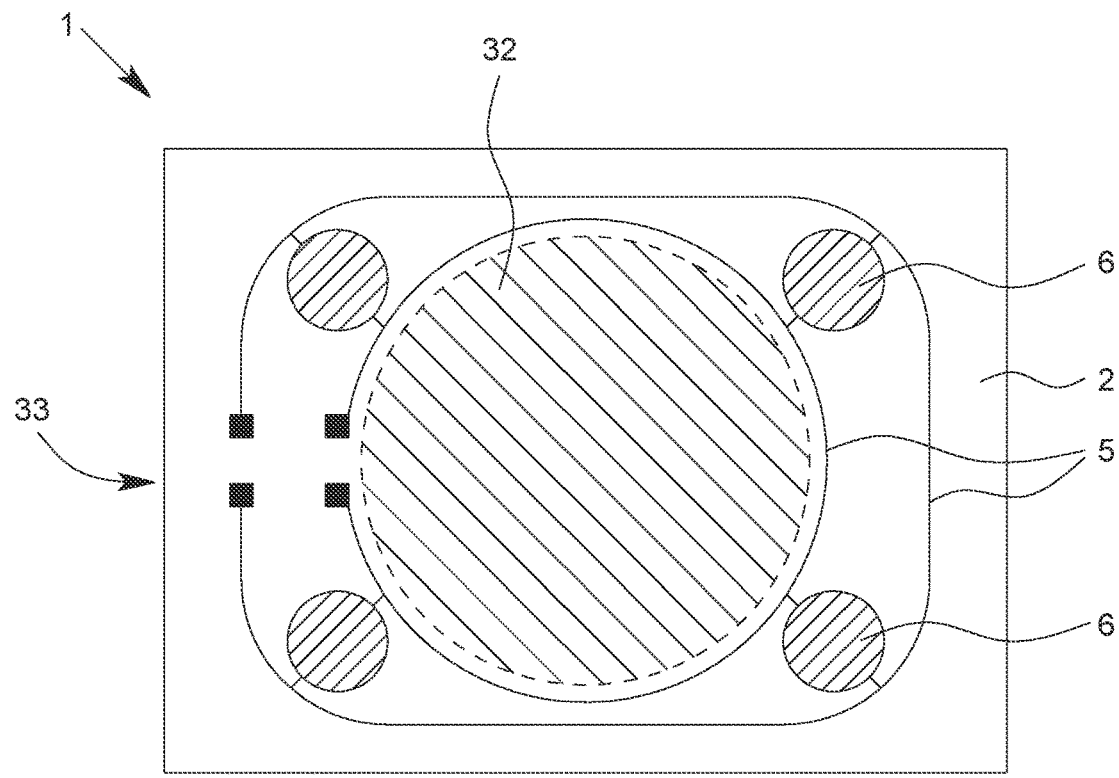
Figure 18:
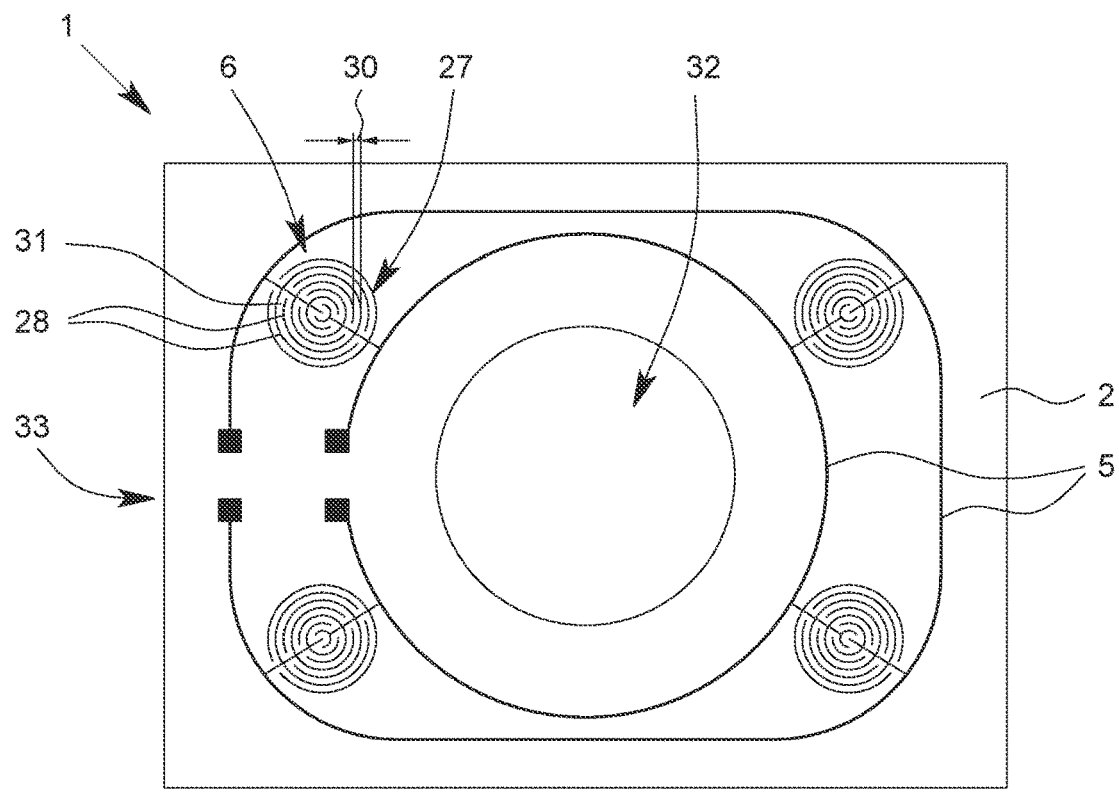
Figure 19:
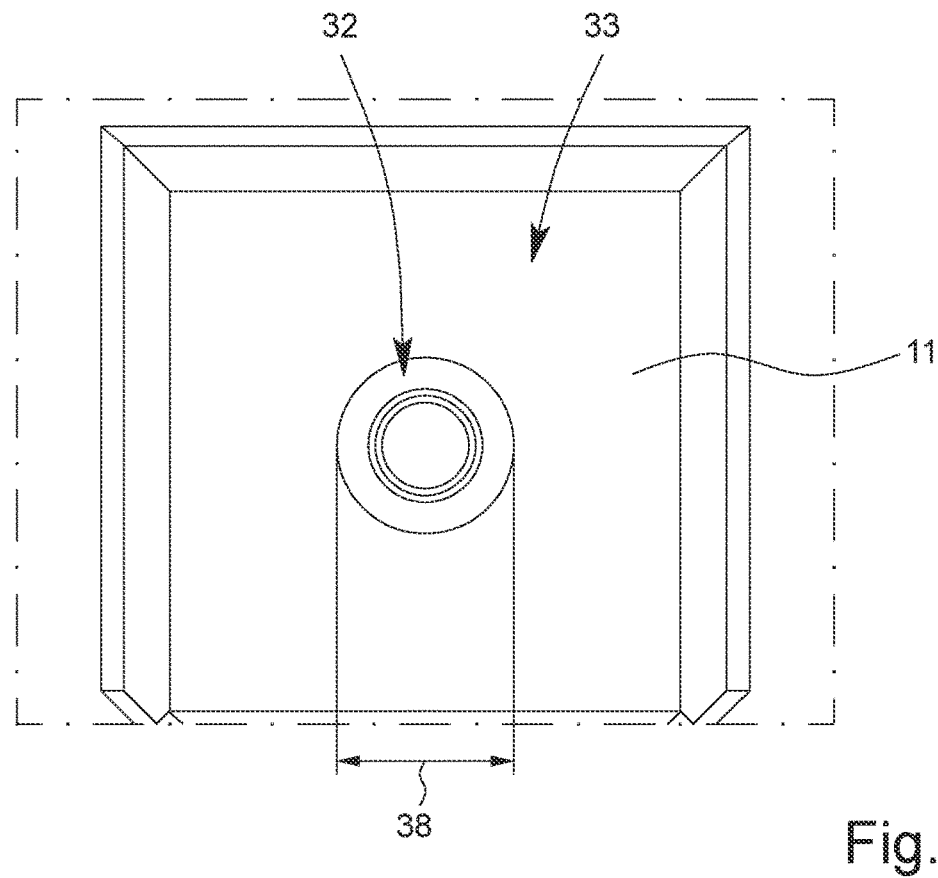
Figure 20:
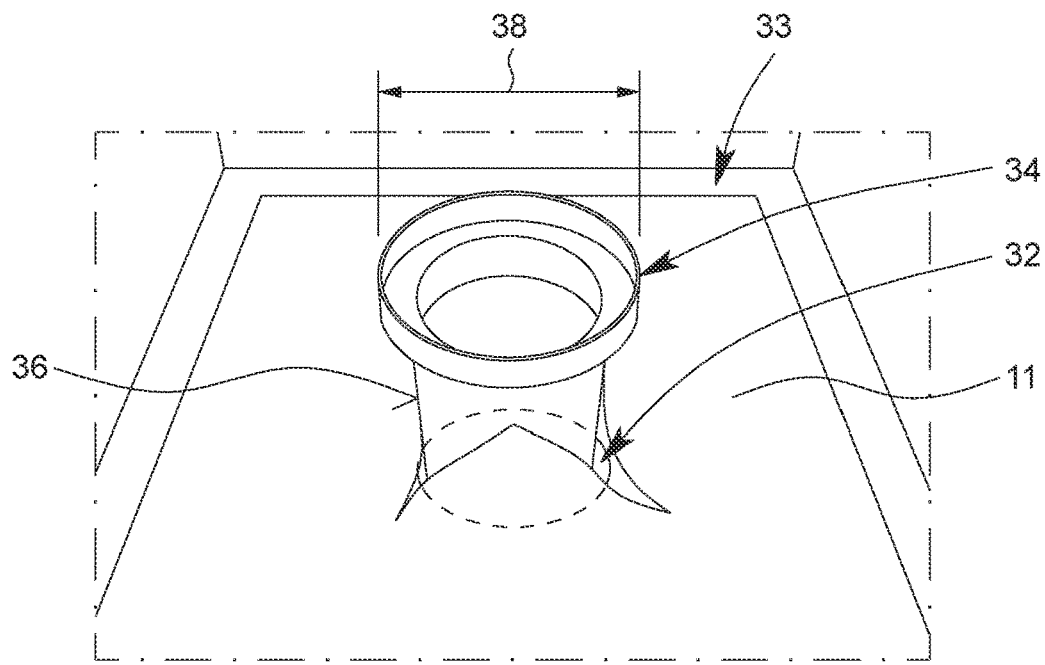
Figure 21:
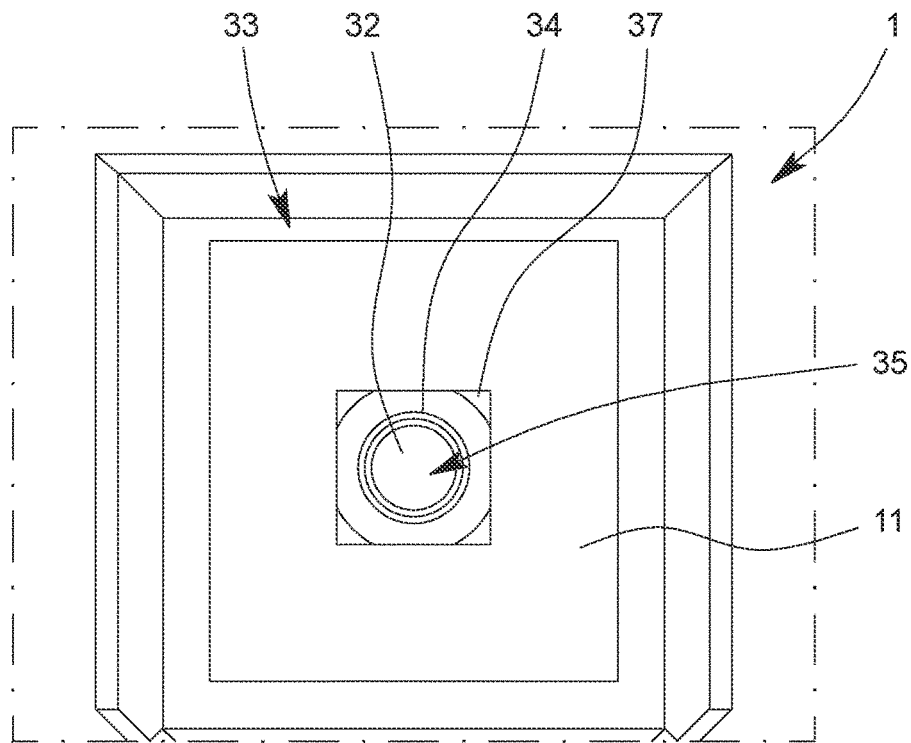
Figure 22:
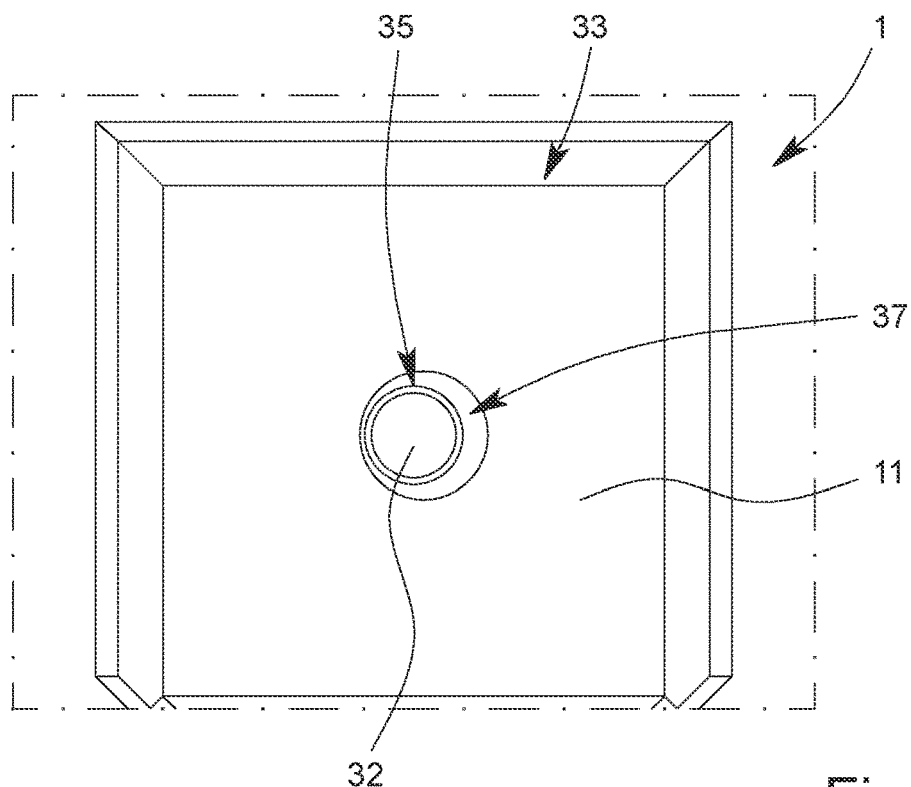
Figure 23:
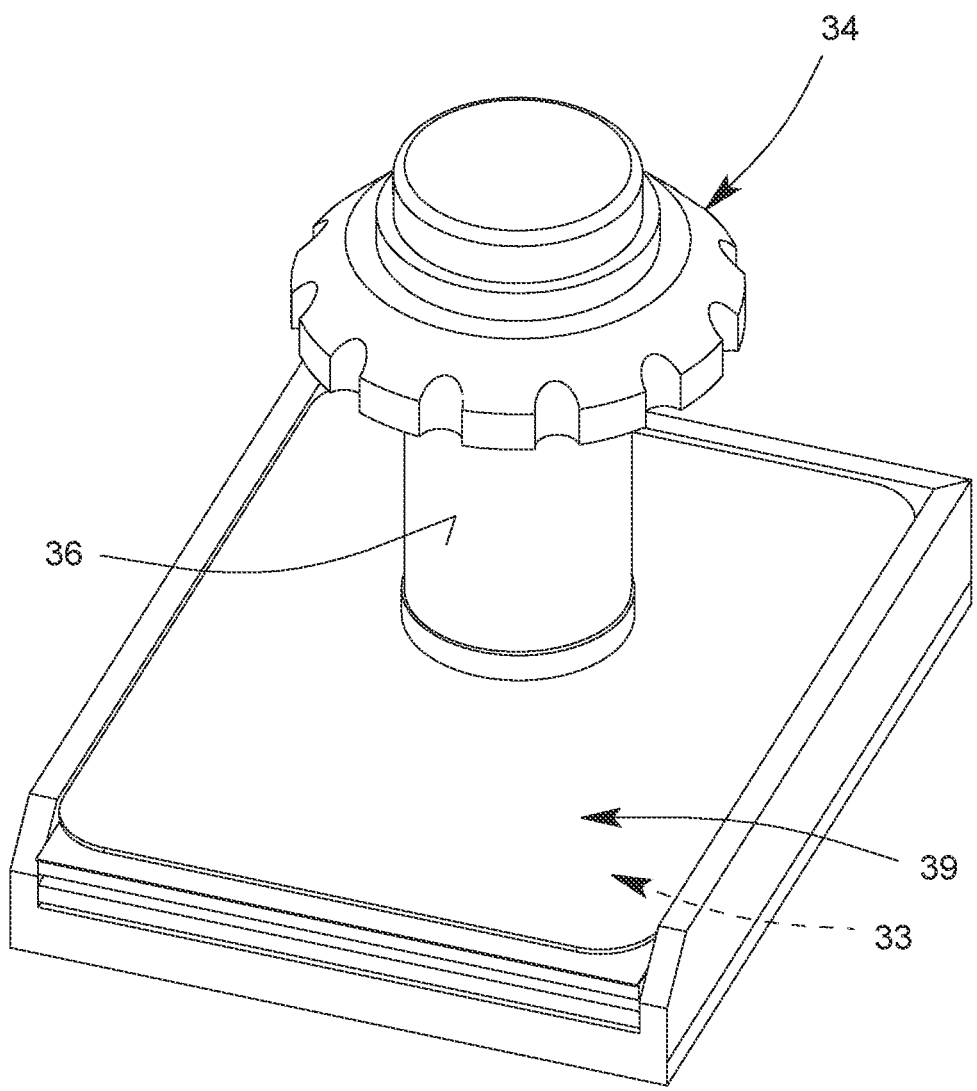

It shows:

FIG. 1 a schematic perspective view of a construction foil according to the invention, FIG. 2 a schematic perspective cross-sectional view of a further embodiment of the construction foil according to the invention, FIG. 3 a schematic representation of a connection device according to the invention, FIG. 4 a schematic perspective view of a further embodiment of the construction foil according to the invention, FIG. 5 a schematic perspective view of a further embodiment of the connection device according to the invention, FIG. 6 a schematic perspective view of a system according to the invention, FIG. 7 a schematic cross-sectional view of a further embodiment of the construction foil according to the invention, FIG. 8 a schematic cross-sectional view of a further embodiment of the construction foil according to the invention, FIG. 9 a schematic top view of a further embodiment of the construction foil according to the invention, FIG. 10 a schematic representation of detail A from FIG. 9, FIG. 11 a schematic perspective view of a further embodiment of the construction foil according to the invention, FIG. 12 a schematic perspective view of a further embodiment of the connection device according to the invention, FIG. 13 a schematic perspective view of a further embodiment of the construction foil according to the invention, FIG. 14 a schematic perspective view of a further embodiment of a system according to the invention, FIG. 15 a schematic top view of a further embodiment of the construction foil according to the invention, FIG. 16 a schematic perspective view of a further embodiment of the construction foil according to the invention, FIG. 17 a schematic representation of a breakthrough element, FIG. 18 a schematic representation of a further embodiment of a breakthrough element, FIG. 19 a schematic perspective view of a further embodiment of a breakthrough element, FIG. 20 a schematic perspective view of a further embodiment of a breakthrough element, FIG. 21 a schematic perspective view of a further embodiment of a breakthrough element, FIG. 22 a schematic perspective view of a further embodiment of a breakthrough element, and FIG. 23 a schematic perspective view of a further embodiment of a breakthrough element.

FIG. 1 shows a construction foil 1. The construction foil 1 can be used in particular in the flat roof area and/or within a sub-roofing. Furthermore, FIG. 1 shows that the construction foil 1 has a carrier layer 2, which is integrated in a layer structure 3. The layer structure 3 can be of single-layer or multi-layer design. In the embodiment example shown in FIG. 1, an at least two-layer layer structure 3 is provided.

FIG. 4 shows a single-layer construction foil 1. The carrier layer 2 has an electronic unit 4.

In FIG. 9, it is shown that the electronic unit 4 may have a plurality of conductor tracks 5 and/or a sensor 6, in particular a humidity sensor. The sensor 6 may be connected to the conductor tracks 5. In particular, the sensor 6 may also be connected to a plurality of the conductor tracks 5.

In addition, FIG. 1 shows that the carrier layer 2 has a first connecting means 7 which protrudes over the carrier layer 2—namely over the outer side 8 of the carrier layer 2. The first connecting means 7 is connected to the electronic unit 4, in particular to the conductor tracks 5 and/or the sensor 6 of the electronic unit 4.

FIG. 1 shows that the first connecting means 7 is designed in such a way that the electronic unit 4 can be electrically connected to an external connection device 9 via the first connecting means 7. The connection of the first connecting means 7 to the external connection device 9 can be made in a detachable manner, in particular in a detachable manner without tools. Via the electrical connection between the first connecting means 7 and the external connection device 9, an electrical contacting of the external connection device 9 to the electronic unit 4 of the construction foil 1 can take place.

FIG. 3 schematically shows an external connection device 9 that can be connected to the first connecting means 7 of the construction foil 1 shown in FIG. 1.

Furthermore, FIGS. 4 to 6 also show a complementary configuration of the first connecting means 7 to the second connecting means 10 of the external connection device 9. Thus, the first connecting means 7 may be complementary to a second connecting means 10 of the external connection device 9, wherein the first connecting means 7 may provide the electrical contact between the second connecting means 10 of the external connection device 9 and the electronic unit 4 of the construction foil 1.

In the embodiment example shown in FIGS. 4 to 6, it is provided that the first connecting means 7 is designed as a connecting means of a complementary connecting system that can preferably be released non-destructively and/or without tools. In the illustrated embodiment example, a push-button connection is provided as the connecting system. The push-button connection has, in particular, a low installation height. For example, the assembly height of the first connecting means 7, which is connected to the second connecting means 10, may in particular not exceed a height of 1 cm.

In FIGS. 11 and 12, a further schematic representation of a complementary connection system is shown. In FIG. 11, it is shown that the construction foil 1 has a first connecting means 7, which may be formed as a male or female part of a hook-and-loop connection.

The connection device 9 may have a second connecting means 10 of complementary design, as shown schematically in FIG. 12. The second connecting means 10 shown in FIG. 12 can be detachably connected to the first connecting means 7 of the construction foil 1 shown in FIG. 11. Accordingly, an electrical contact to the electronic unit 4 of the construction foil 1 can be ensured via the connecting means 9.

It is not shown that an adhesive connection can also be provided as a connection system.

The first connecting means 7 may protrude between 0.5 to 15 mm beyond the outer surface 8 of the carrier layer 2.

FIG. 9 shows that the carrier layer 2 has an electronic unit 4 with at least one sensor 6. In the embodiment shown, the sensor 6 is designed as a humidity sensor.

FIG. 1 shows that the electronic unit 4 has at least one conductor track 5, with the first connecting means 7 being electrically conductively connected to at least one conductor track 5. FIG. 1 does not show that alternatively or additionally the first connecting means 7 can also be electrically connected to the sensor 6.

FIG. 1 further shows that the construction foil 1 can have between 1 and 20—namely in particular six in the embodiment example shown—first connecting means 7. In FIG. 11, it is shown that a first connecting means 7 is provided on the construction foil 1.

FIG. 13 shows that the construction foil 1 can comprise both the first connecting means 7 and the second connecting means 10. Thus, the construction foil 1 can comprise the external connection device 9 for another construction foil 25. The connection device 9 comprising the second connecting means 10 may be arranged on the opposite outer side 26 comprising the first connecting means 7, in particular wherein the second connecting means 10 may be electrically connected to the first connecting means 7 and/or the electronic unit 4. In this way, the construction foils 1, 25 can be electrically connected to one another via the first and second connecting means 7, 10, as shown schematically in FIG. 14.

The carrier layer 2 shown in FIG. 2 is designed as a waterproof film layer. In further embodiments, the carrier layer 2 may comprise and/or consist of a plastic, preferably a thermoplastic, in particular polypropylene, polyethylene and/or polyethylene terephthalate.

FIG. 2 shows that the layer structure 3 has at least one textile layer 11 firmly bonded to the carrier layer 2. In the embodiment shown, the textile layer 11 is formed as a nonwoven layer. In further embodiments, it may be provided that the textile layer 11 is a fabric layer. In the illustrated embodiment example, the electronic unit 4 is arranged between the textile layer 11 and the carrier layer 2, namely on the outer side 8 of the carrier layer 2.

In FIGS. 1 and 2, it is shown that the textile layer 11 has a recess 12 in the area of the first connecting means 7 to ultimately provide access to the first connecting means 7.

Alternatively or additionally, it can be provided that the first connecting means 7 protrudes over the textile layer 11. In the embodiment example shown in FIG. 2, no projection of the first connecting means 7 over the textile layer 11 is provided.

In particular, in further embodiments, the first connecting means 7 may protrude beyond the outer surface 13 of the textile layer 11 facing away from the carrier layer 2.

FIG. 15 shows that the width 14 of the carrier layer 2 does not extend over the entire width 15 of the textile layer 11. In the embodiment example shown in FIG. 15, it is provided that the width 14 of the carrier layer 2 extends over at least 3% of the width 15 of the textile layer 11, in particular the width 14 of the carrier layer 2 may extend to between 8% to 16% of the width 15 of the textile layer 11. FIG. 15 further shows that the carrier layer 2 disposed on the textile layer 11 is spaced from the outer edges 16 of the textile layer 11. Ultimately, the carrier layer 2 shown in FIG. 15 is disposed at least substantially centrally on the textile layer 11.

In addition, FIG. 15 shows that the outer edges 17 of the carrier layer 2 are at least substantially parallel to the outer edges 16 of the textile layer 11. Furthermore, FIG. 15 shows that the longitudinal axis 18, which runs in the direction of the greatest extension of the carrier layer 2, runs parallel to the longitudinal axis 19 of the textile layer 11, in particular wherein the axes 18 and 19 can lie one above the other in further embodiments.

FIG. 16 shows that the layer structure 3 has a further layer 20 for forming the construction foil 1 as a roofing membrane. In further embodiments, it may be provided that the further layer 20 forms the layer structure 3 as a roofing sheet, facade roofing sheet, facade sheet and/or vapor barrier and/or sub-roofing sheet, in particular underlayment and/or sarking sheet.

The further layer 20 can be designed as a functional layer, which in particular is designed to be vapor-barrier and/or diffusion-tight. In particular, the roofing membrane as shown in FIG. 16 can be used as a flat roofing membrane.

FIG. 14 shows a system 21 with at least one construction foil 1 according to one of the embodiments described above and an external connection device 9 for electrical contacting of the at least one first connecting means 7 of the construction foil 1. The connection device 9 has at least one second connecting means 10 designed to be complementary to the first connecting means, wherein the first and second connecting means 7, 10 are detachably connected to one another without tools.

It is not shown that the connection device 9 can be connected to an evaluation device, preferably for evaluating the measurement results detected by the sensor 6 of the electronic unit 4. Alternatively or additionally, it can be provided that the connection device 9 is connected to a power supply device.

In FIG. 6, it is shown that the connection device 9 has at least one conductor cable 22. It is not shown that the connection device 9 has at least one connection conductor track for electrical connection. The conductor cable 22 can be connected to the second connecting means 10, as shown schematically in FIG. 3.

FIG. 3 also shows that the connection device 9 has at least one contacting means 23. In the embodiment example shown in FIG. 14, it is provided that the contacting means 23 is designed as a male or female contacting means 23 of a plug connection to be formed. The contacting means 23 is provided for connecting further electronic components, such as a power supply device. FIG. 3 shows that the contacting means 23 is connected to the second connecting means 10 via at least one conductor cable 22.

FIG. 13 shows schematically that the connection device 9 can be provided on a further construction foil 25, so that electrical contact is made between the construction foils 1, 25 via the connection between the first connecting means 7 of the construction foil 1 and the second connecting means 10 of the connection device 9 of a further construction foil 25.

Finally, FIG. 13 shows a construction foil 1 that has both a first connecting means 7 and a second connecting means 10, so that the construction foil 1 shown in FIG. 13 is connected to further construction foils 25. Further, FIG. 13 shows that the construction foil 1 also has a further first connecting means 7, which may be different from the connecting means 7 for connecting the further construction foil 25. This further connecting means 7 can be provided in particular for connecting a connection device 9 which is not arranged on a further construction foil 25, as this is shown schematically in FIG. 14.

FIG. 14 shows interconnected construction foils 1, 25, which are connected to one another in particular via the first and second connecting means 7, 10. At least one construction foil 1 is connected to an external connection device 9, which has a contacting means 23—namely a part of a plug connection. Via the external connection device 9, which is not provided on a construction foil 1, the electrical supply of all construction foils 1, 25 and/or the data transmission between all construction foils 1, 25 can be ensured.

In further embodiments, it can be provided that the first and second connecting means 7, 10 can be releasably connected to one another in a form-fitting, friction-fitting, material-fitting and/or latching manner. In the embodiments shown in FIGS. 4 to 6, it is provided that the connecting means 7, 10 can be positively connected to one another.

The first and second connecting means 7, 10 can form a complementary connecting system, which in particular can be released non-destructively and/or without tools. In the embodiment example shown in FIGS. 11 and 12, it is provided that the first connecting means 7, as shown in FIG. 11, can cooperate with the second connecting means 10 shown in FIG. 12, wherein the connecting means 7, 10 can form a hook-and-loop connection.

In FIGS. 4 to 6, it is shown that the first and second connecting means 7, 10 can form a complementary connecting system in the form of a push-button connection.

In FIG. 3, it is shown that the second connecting means 7 of the connection device 9 is arranged in a housing 24. The housing 24 can serve as an abutment that is required when the connection between the first and second connecting means 7, 10 is made. Via the housing 24, the counterpressure required for bringing together or latching the connecting means 7, 10 can be provided.

The connection device 9 can in particular have a nonwoven layer and/or fabric layer and/or foil layer on which the second connecting means 10 can be arranged. Alternatively or additionally, it can be provided that the nonwoven layer of the connection device 9 has, preferably printed-on, connection conductor tracks for electrical contacting of the second connecting means 10.

FIG. 7 shows a construction foil 1 with a multilayer structure 3. The layer structure 3 has a carrier layer 2 and a textile layer 11. An electronic unit 4 is printed on the outer side 13 of the carrier layer 2.

FIG. 9 shows that the imprinted electronic unit 4 has a humidity sensor 6.

The textile layer 11 shown in FIGS. 7 and 8 is water-absorbent and thus water-permeable. The electronic unit 4 is provided between the carrier layer 2 and the hydrophilic textile layer 11. Thus, the outer side 13 faces the textile layer 11. Schematically, FIG. 9 shows that the moisture sensor 6 is in direct contact with the textile layer 11. In FIG. 7, the moisture sensor 6 is integrated in the electronic unit 4 and is not shown in more detail, wherein the moisture sensor 6 as well as the electronic unit 4 are arranged on the textile layer 11.

FIG. 10 shows detail A of FIG. 9. The moisture sensor 6 shown in FIG. 10 is designed as a resistive moisture sensor 6. For resistive moisture measurement, the moisture sensor 6 has at least two adjacent electrically conductive measuring conductor tracks 27. In the illustrated embodiment example, the measuring conductor tracks 27 form a rounded, in particular at least substantially circular, sensor field. The sensor field shown has at least a substantially labyrinthine structure.

FIG. 10 further shows that the two sensing conductor tracks 27 of the humidity sensor 6 mesh with each other. In addition, the illustrated sensing conductor tracks 27 form a plurality of protruding fingers 28. In the embodiment example of FIG. 10, the fingers 28 engage and comb with each other. Furthermore, the fingers 28 are formed at least substantially in the shape of arc sections, in particular in the shape of arc sections. A water line 31 is formed between two immediately adjacent fingers 28.

FIG. 10 shows that the formed water lines 31 have an at least substantially rounded shape and, in particular, are at least substantially circular ring section-shaped. In particular, a water line 31 can form the shape of a half circular ring.

Furthermore, FIG. 10 shows that the moisture sensor 6 is connected to at least one conductor track 5 of the electronic unit 4. In the illustrated embodiment, the humidity sensor 6 is connected to a plurality of conductor tracks 5. In further embodiments, the moisture sensor 6 may be connected to three to eight conductor tracks 5.

Furthermore, FIG. 10 shows that one measuring conductor track 27 (namely the lower measuring conductor track 27) is electrically connected to at least one conductor track 5—in the illustrated embodiment example to exactly one conductor track 5—of the electronic unit 4. The further measuring conductor track 27 (namely the upper measuring conductor track 27) is connected to a plurality of conductor tracks 5. In the illustrated embodiment example, the upper measuring conductor track 27 is connected to five conductor tracks 5.

In the embodiment shown in FIG. 7, the carrier layer 2 is diffusion-tight. In further embodiments, it may be provided that the carrier layer 2 is diffusion-inhibiting and/or impermeable to water vapor.

It is not shown that the textile layer 11 is formed as a nonwoven layer and in particular comprises hydrophilic fibers. In particular, fibers comprising polyethylene terephthalate (PET) as the material may be provided as hydrophilic fibers. Alternatively or additionally, it may be provided that the fibers of the textile layer 11 have a hydrophilic coating.

FIG. 9 shows schematically that a plurality of moisture sensors 6 are provided along the length of the construction foil 1. In further embodiments, the moisture sensors 6 can be equally spaced apart.

The distance 29 between two directly adjacent humidity sensors 6 can be between 10 cm to 5 m. In the embodiment example shown in FIG. 9, it is provided that the distance 29 is at least substantially 40 cm+/−10 cm.

The sensor field of the humidity sensor 6 formed in FIG. 10 can have a diameter or a maximum extension between 3 to 8 cm.

The width 30 of the water line 31, or the distance 30 between two immediately adjacent fingers 28, can range from 1 mm to 20 mm.

The width 14 of the carrier layer 2 can be between 1 to 100 cm. Furthermore, the width 15 of the textile layer can be between 0.5 to 3 m. However, the widths 14, 15 can vary, especially relative to each other.

FIG. 7 shows that the layer structure 3 has two layers and consists of the carrier layer 2 and the textile layer 11. The electronic unit 4 is printed on the carrier layer 2 and is ultimately regarded as a component of the carrier layer 2.

Not shown is a roof structure, which is provided in particular for a flat roof. The roof structure can have a construction foil 1 according to one of the embodiments described above. At least in the installed state of the construction foil 1, the moisture sensor 6 can be arranged on the upper side of the construction foil 1, facing the weather side, or on the lower side, facing away from the weather side.

Also not shown is that the layer structure 3 has a further textile layer, in particular a further nonwoven layer. The further non-woven layer can be arranged on the side of the construction foil 1 opposite the textile layer 11. Alternatively or additionally, it may be provided that the further textile layer is arranged on the side of the carrier layer 11 facing away from the electronic unit 4—namely the outer side 26.

FIG. 17 shows the use of a construction foil 1 according to the previously described embodiments according to FIGS. 1 to 16 as a breakthrough element 33. The breakthrough element 33 is used in particular in roof construction, preferably in flat roof construction. The construction foil 1 formed as a breakthrough element 33 has at least one breakthrough 32 of the construction foil 1. The breakthrough 32 serves to arrange and receive a breakthrough body 34. The breakthrough body 34 is not a component of the breakthrough element 33. Accordingly, the breakthrough element 33 can enclose the breakthrough body 34, at least in certain areas, and/or monitor the latter to the effect that any penetration of moisture is detected. In further embodiments, it may also be provided that a further construction foil, further construction foil sections and/or a sealing foil are used to seal the breakthrough body 34, wherein the breakthrough element 33 is used in an area that is to be sealed, whereby the breakthrough element 33 may provide monitoring of moisture penetration. However, in further embodiments, the sealing function, in particular against water, can also be provided by the breakthrough element 33 itself, in particular by the carrier layer 2 and/or at least one further layer 20.

A drain, for example a flat roof drain, and/or a ventilator, in particular a ventilation pipe, can be provided as a breakthrough body 34. In particular, the breakthrough element 33 functions as a sleeve element for the breakthrough body 34, which can be enclosed or surrounded by the breakthrough element 33 at least in regions, preferably completely. In this context, it can be provided that, at least in certain regions, a distance is produced between the outer side of the breakthrough 32 of the construction foil 1 and the breakthrough body 34, or that the breakthrough 32 of the construction foil 1 is arranged on the outer side 36 of the breakthrough body 34 in such a way that a closure is produced. For example, the construction foil 1 can be led up along the outer side 36 of the breakthrough body 34 so that the construction foil 1 can nestle against the breakthrough body 34 in this area.

FIG. 17 shows schematically that an area of the construction foil 1 can be formed as a breakthrough 32. This breakthrough 32 can be introduced at the factory or by the user. For example, the user can be shown which "possible" area can "function" as a breakthrough 32. Within this area, the user is then comparatively free to make an incision to form the breakthrough 32, so that the breakthrough 32 can be adapted to the individually provided breakthrough body 34. This allows for an increase in flexibility.

FIG. 17 shows four moisture sensors 6 arranged adjacent to the area that may form the breakthrough 32 (indicated schematically by hatching in FIG. 17). The moisture sensors 6 may be interconnected via conductive paths 5. In the embodiment example shown in FIG. 17, it is provided that neither the moisture sensors 6 nor the conductor tracks 5 are interrupted and/or pierced by the breakthrough 32. In the embodiment shown in FIG. 17, a one-piece design of the breakthrough element 33 is provided. In further embodiments not shown, the breakthrough element 33 may well be of multi-part design, in particular depending on the outer dimensions of the breakthrough body 34.

The conductor tracks 5 can electrically connect the humidity sensors 6 to each other.

In further embodiments, between 3 to 20 moisture sensors 6 can be used at the breakthrough element 33. In particular, the number of moisture sensors 6 used also depends on the outer dimensions of the breakthrough 32.

FIG. 18 shows that the conductor tracks 5 are arranged around the breakthrough 32.

In the embodiment shown in FIGS. 19 to 23, different breakthroughs 32 and breakthrough bodies 34 are shown. In FIG. 21, it is shown that the carrier layer 2 has a first breakthrough 35. In FIG. 21, however, the breakthrough body 34 is also visible, so that the breakthrough 35 of the carrier layer 2 can only be recognized in a "concealed" manner. In the embodiment example shown in FIG. 21, the first breakthrough 35 terminates with the breakthrough body 34.

FIG. 23 shows that the penetration element 33 is arranged below a waterproofing layer 39, in particular a waterproof sub-roofing membrane, and monitors the penetration of moisture below the waterproofing membrane 39.

Alternatively or additionally, it may be provided that the breakthrough element 33 is arranged on a vapor barrier and/or below a sealing layer, in particular below a sealing sheet 39.

The carrier layer 2 of the construction foil 1 can be guided up along the outer side 36 of the breakthrough body 34 at least in some areas, in particular the carrier layer 2 nestles against the outer side 36 of the breakthrough body 34 in this area. In addition, the breakthrough body 34 may be bonded and/or connected to the carrier layer 2 in this region, in particular in a sealing manner.

FIG. 21 shows that the textile layer 11 has a further breakthrough 37 which is larger than the first breakthrough 35 the carrier layer 2. The further breakthrough 37 may be spaced apart from the outer side 36 of the breakthrough body 34, at least in some regions, and may further alternatively or additionally be arranged on the outer side 36 of the breakthrough body 34, at least in some regions.

In FIG. 22, it is shown that both the first breakthrough 35 and the second breakthrough 37 are at least substantially flush with each other. In FIG. 22, however, the breakthrough body 34 is not shown in more detail.

In FIG. 20, it is shown that the carrier layer 2 has a breakthrough 32. The textile layer 11 has incisions, in particular a cross incision. The breakthrough body 34 can be guided through these incisions. The sections of the textile layer that are arranged in the breakthrough 32 can be guided up along the outer side 36 of the breakthrough body 34, as shown schematically in FIG. 20.

The breakthrough body 34 shown in FIG. 23 can have an outer diameter of at least 20 mm, preferably between 100 mm to 300 mm. Thus, the at least one breakthrough 32 of the construction foil 1 may also have an outer diameter 38 between 100 to 300 mm.

Preferably, the outer diameter of the breakthrough 32 is formed to correspond to the outer diameter 38 of the breakthrough body 34, in particular since the breakthrough 32 at least substantially corresponds to the outer shape of the breakthrough body 34, so that an at least substantially flush closure is formed between the breakthrough 32 and the breakthrough body 34.

Not shown in more detail is that the breakthrough body 34 can also have a maximum length of at least 1 m and/or a maximum width of at least 1 m. In particular, the breakthrough body 34 may also have an at least substantially rectangular outer shape, in particular wherein the length may be between 1 to 2 m and the width may be between 1 to 2 m. Such outer shapes result, for example, in skylight domes used in flat roof applications.

Particularly for larger breakthrough bodies 34, it is advantageous if the breakthrough element 33 is formed in at least two parts. In particular, at least two separate sections of the construction foil 1 can form the breakthrough element 38. These elements can be electrically connected to one another via the connection system described below. Ultimately, different sections of the construction foil 1 can form the breakthrough element 33. The breakthrough element 33 may be arranged around the breakthrough body 34 at least in certain areas, preferably completely surrounding the breakthrough body 34. Ultimately, the breakthrough element 33 ensures moisture monitoring in the roof structure in the area of the breakthrough body 34.

In further embodiments, the breakthrough body 34 may have an at least substantially circular outer cross-section in the region of the construction foil 1. In principle, however, different outer shapes are possible for the breakthrough element 33.

LIST OF REFERENCE SIGNS

1 Construction foil
2 Carrier layer
3 Layer structure
4 Electronic unit
5 Conductor track
6 Sensor
7 First connecting means
8 Outer side of 2
9 External connection device
10 Second connecting means
11 Textile layer
12 Recess
13 Outer side of 11
14 Width from 2
15 Width from 11
16 Outer edge of 11
17 Outer edge of 2
18 Longitudinal axis from 2
19 Longitudinal axis from 11
20 Further layer
21 System
22 Conductor cable
23 Contacting means
24 Housing
25 Further construction foil
26 Outer side of 2
27 Measuring conductor track
28 Finger
29 Distance
30 Distance
31 Water line
32 Breakthrough
33 Breakthrough element
34 Breakthrough body
35 First breakthrough
36 Outer side
37 Further breakthrough
38 (Outer) diameter
39 Sealing layer

The invention claimed is:

1. A roof moisture monitoring system configured to detect moisture within a building envelope comprising:
   an external connection device; and
   a roofing membrane comprising:
      a carrier layer, wherein the carrier layer is a waterproof film layer, and the carrier layer comprises one or more of: a plastic, a thermoplastic, a polypropylene, a polyethylene and a polyethylene terephthalate,
      an electronic unit on the carrier layer wherein the electronic unit includes at least one moisture sensor, and a plurality of first electrical connectors on the carrier layer that respectively project beyond an outer side of the carrier layer and are electrically connected to the electronic unit, wherein the electronic unit is printed on the outer side of the carrier layer, wherein at least one of the plurality of first electrical connectors is configured so that the electronic unit can be detachably connected electrically to the external connection device via the at least one of the plurality of first electrical connectors, wherein the plurality of first electrical connectors are a part of a complementary connecting system that is configured to be released without destruction and/or without tools, and a portion of the complementary connecting system is configured such that the roofing membrane can be attached, via at least another one of the plurality of first electrical connectors, to an adjacent roofing membrane, and wherein the complementary connecting system comprises a push-button connection, a hook-and-loop fastener connection and/or an adhesive connection to connect the plurality of first electrical connectors; and at least one further layer positioned on a first side of the carrier layer, the first side of the carrier layer being on an opposite side of the carrier layer from the electronic unit, the carrier layer, the at least one further layer, the electronic unit, the at least one moisture sensor, the at least one electrical connector and the connecting system forming the roofing membrane.

2. The roof moisture monitoring system according to claim 1, wherein the plurality of first electrical connecters protrude between 0.5 to 15 mm beyond the outer side of the carrier layer.

3. The roof moisture monitoring system according to claim 1, wherein the electronic unit further includes at least one conductor track, wherein at least one of the plurality of the first electrical connectors is electrically conductively connected to the at least one conductor track.

4. The roof moisture monitoring system according to claim 1, wherein the roofing membrane further includes one or more of: at least one textile layer, a nonwoven layer and a fabric layer, which is bonded to the carrier layer, wherein the electronic unit is provided between the at least one textile layer and the carrier layer, between the nonwoven layer and the carrier layer, or between the fabric layer and the carrier layer.

5. The roof moisture monitoring system according to claim 4, wherein the at least one textile layer has a recess in a region of each of the plurality of first electrical connectors, and/or each of the plurality of first electrical connectors project beyond an outer side of the textile layer facing away from the carrier layer.

6. The roof moisture monitoring system according to claim 4, wherein one or more of:
a width of the carrier layer extends over at least 3% of the width of the at least one textile layer,
the carrier layer arranged on the at least one textile layer is one or more of: spaced apart from outer edges of the at least one textile layer and arranged centrally on the at least one textile layer,
outer edges of the carrier layer and of the at least one textile layer extend at least substantially parallel to one another, and
a longitudinal axis of the carrier layer extends at least substantially parallel to a longitudinal axis of the at least one textile layer.

7. The roof moisture monitoring system according to claim 1, wherein the connection device has at least one second electrical connector formed complementary to the plurality of first electrical connectors and wherein the first and the second electrical connectors can be detachably connected to one another, and wherein the first and second electrical connectors form the complementary connecting system.

8. The system according to claim 7, further comprising an evaluation device is connected or connectable to the connection device and configured to evaluate measurement results detected by the at least one moisture sensor of the electronic unit, and/or a power supply device connected or connectable to the connection device.

9. The system according to claim 7, wherein the connection device has at least one plug configured to connect further electronic components, and the at least one plug is electrically connected to the second electrical connector via at least one conductor cable.

10. The system according to claim 7, wherein the connection device is provided on a further roofing membrane wherein electrical contact is made between the roofing membrane and the further roofing membrane via connection between the at least of the plurality of first electrical connectors of the roofing membrane and the second electrical connector of the connection device of the further roofing membrane.

11. The system according to claim 7, wherein the first and second electrical connectors can be releasably connected to one another in a form-fitting, friction-fitting, material-fitting and/or latching manner.

12. A flat roof moisture monitoring system configured to detect moisture within a building envelope comprising:
an external connection device; and
a roofing membrane comprising:
a carrier layer, an electronic unit on the carrier layer, the electronic unit including at least one moisture sensor, and
a plurality of first electrical connectors on the carrier layer that are at least electrically connected to the electronic unit and respectively project from an outer side of the carrier layer, wherein the electronic unit is printed on the outer side of the carrier layer,
wherein:
at least one of the plurality of first electrical connectors is configured such that the electronic unit can be detachably connected electrically to the external connection device,
the plurality of first electrical connectors are a part of a complementary connecting system that is configured to be released non-destructively and/or without tools, and a portion of the complementary connecting system is configured such that the roofing membrane can be attached, via at least another one of the plurality of first electrical connectors, to an adjacent roofing membrane, and
the complementary connecting system provides a push-button connection, a hook-and-loop fastener connection and/or an adhesive connection to connect the plurality of first electrical connectors; and
at least one further layer positioned on a first side of the carrier layer, the first side of the carrier layer being on an opposite side of the carrier layer from the electronic unit, the carrier layer, the at least one further layer, the electronic unit, the at least one moisture sensor, the at least one electrical connector and the connecting system forming the roofing membrane.

* * * * *